United States Patent
Kroll et al.

(10) Patent No.: US 11,914,251 B2
(45) Date of Patent: Feb. 27, 2024

(54) LIGHT MODULATION DEVICE FOR A DISPLAY FOR REPRESENTING TWO- AND/OR THREE-DIMENSIONAL IMAGE CONTENT

(71) Applicant: SEEREAL TECHNOLOGIES S.A., Munsbach (LU)

(72) Inventors: Bo Kroll, London (GB); Norbert Leister, Dresden (DE); Gerald Futterer, Metten (DE); Robert Missbach, Kreischa/ot Baerenklause (DE); Stephan Reichelt, Wangen i.A. (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/711,207

(22) Filed: Apr. 1, 2022

(65) Prior Publication Data
US 2022/0229335 A1 Jul. 21, 2022

Related U.S. Application Data

(63) Continuation of application No. 17/315,949, filed on May 10, 2021, now Pat. No. 11,294,246, which is a
(Continued)

(30) Foreign Application Priority Data

Jun. 23, 2009 (DE) .......................... 102009027100.7
Aug. 18, 2009 (DE) .......................... 102009028626.8
Apr. 29, 2010 (DE) .......................... 102010028398.3

(51) Int. Cl.
*G02F 1/1343* (2006.01)
*G02B 30/00* (2020.01)
(Continued)

(52) U.S. Cl.
CPC ....... *G02F 1/134309* (2013.01); *G02B 30/00* (2020.01); *G02B 30/20* (2020.01);
(Continued)

(58) Field of Classification Search
CPC ..................................................... G02F 1/1343
See application file for complete search history.

(56) References Cited

U.S. PATENT DOCUMENTS

| 4,190,330 A | 2/1980 | Berreman |
| 4,639,091 A * | 1/1987 | Huignard ............. G02B 5/1828 349/182 |

(Continued)

FOREIGN PATENT DOCUMENTS

| EP | 1605450 A2 | 12/2005 |
| EP | 1657586 A2 | 5/2006 |

(Continued)

OTHER PUBLICATIONS

Brauer , et al., "Diffusers in digital holography", J. Optical Society of America, vol. 8, No. 3, Mar. 1991, 572-578.
(Continued)

*Primary Examiner* — Sang V Nguyen
(74) *Attorney, Agent, or Firm* — Saul Ewing LLP

(57) ABSTRACT

The invention relates to a light modulation device for a display for representing two- and/or three-dimensional image content or image sequences. The light modulation device comprises a light modulator and a controller. The phase and/or the amplitude of a light wave field, which is substantially collimated, can be varied by means of the light modulator depending on the location of the light modulator. The light modulator can be actuated by means of the control device. According to the invention, in the direction of propagation of the light wave field, at least one diffracting unit is arranged downstream of the light modulator. The
(Continued)

diffracting unit has a variable diffracting structure. By means of the diffracting structure, the light wave field varied by the light modulator can be diffracted in a variable and predeterminable manner. Further, the present invention relates to a display and a method for producing a light modulation device.

17 Claims, 14 Drawing Sheets

Related U.S. Application Data continuation of application No. 16/901,432, filed on Jun. 15, 2020, now Pat. No. 11,002,982, which is a continuation of application No. 13/126,866, filed as application No. PCT/EP2010/058625 on Jun. 18, 2010, now Pat. No. 10,684,489.

(60) Provisional application No. 61/329,148, filed on Apr. 29, 2010.

(51) Int. Cl.
| | | |
|---|---|---|
| G02B 30/20 | (2020.01) | |
| G02F 1/1347 | (2006.01) | |
| G02F 1/29 | (2006.01) | |
| G03H 1/02 | (2006.01) | |
| G03H 1/22 | (2006.01) | |
| G02F 1/1335 | (2006.01) | |
| G03H 1/26 | (2006.01) | |

(52) U.S. Cl.
CPC ............ *G02F 1/1347* (2013.01); *G02F 1/292* (2013.01); *G03H 1/02* (2013.01); *G03H 1/2205* (2013.01); *G03H 1/2294* (2013.01); G02F 1/133504 (2013.01); G02F 1/134318 (2021.01); G02F 2203/24 (2013.01); G03H 2001/0224 (2013.01); G03H 2001/2615 (2013.01); G03H 2001/264 (2013.01); G03H 2225/11 (2013.01); G03H 2225/23 (2013.01); G03H 2225/55 (2013.01); G03H 2225/60 (2013.01); *Y10T 29/49155* (2015.01)

(56) References Cited

U.S. PATENT DOCUMENTS

| | | | |
|---|---|---|---|
| 5,150,241 | A | 9/1992 | Joffre et al. |
| 5,430,561 | A | 7/1995 | Kato et al. |
| 5,784,141 | A * | 7/1998 | Chen .................. G02F 1/133753 349/163 |
| 5,831,698 | A | 11/1998 | Depp et al. |
| 6,686,984 | B1 * | 2/2004 | Hoke ................ G02F 1/134363 385/143 |
| 8,804,220 | B2 | 8/2014 | Leister et al. |
| 2002/0126332 | A1 | 9/2002 | Popovich |
| 2002/0180659 | A1 | 12/2002 | Takahashi |
| 2004/0022677 | A1 | 2/2004 | Wohlstadter et al. |
| 2005/0017925 | A1 | 1/2005 | Birdwell |
| 2005/0276205 | A1 | 12/2005 | Heor et al. |
| 2006/0139711 | A1 | 6/2006 | Leister et al. |
| 2007/0035809 | A1 | 2/2007 | Maram et al. |
| 2010/0103485 | A1 * | 4/2010 | Haussler .................. G03H 1/02 359/9 |
| 2010/0157026 | A1 | 6/2010 | Reichelt |
| 2010/0271676 | A1 | 10/2010 | Renaud-Goud |
| 2010/0277779 | A1 | 11/2010 | Futterer et al. |
| 2011/0122467 | A1 | 5/2011 | Futterer et al. |

FOREIGN PATENT DOCUMENTS

| | | | |
|---|---|---|---|
| FR | 2254057 A1 | 7/1975 | |
| JP | 05188343 | * 7/1993 | ............... G02F 1/13 |
| WO | 2008049912 A1 | 5/2008 | |

OTHER PUBLICATIONS

Jenkins, et al., "Encyclopedia Article: Diffraction", AccessSience from McGraw-Hill [online] 2008, URL: http://accessscience.com/popup.aspx?id=193900&name=print> retrieved on Jan. 2, 2011 XP002620577.

Poon, "Digital Holography and Three-Dimensional Display", Springer Science, 3.1 Concept of time-sequential multiview projection display, 2.4 LCD 3D display systems with diffractive (hologrpahic) optical elements, pp. 386-390 XP002620578, 2006, 316-317.

Schulze, "Syntehsis of Moving Holographic Stereograms with High-Resolution Spatial Light Modulators", Proceedings of SPIE, vol. 2406, 6, Aug. 1995, 124-131.

* cited by examiner

LIGHT MODULATION DEVICE FOR A DISPLAY FOR REPRESENTING TWO- AND/OR THREE-DIMENSIONAL IMAGE CONTENT

CROSS REFERENCE TO RELATED APPLICATIONS

This application is a continuation of U.S. application Ser. No. 17/315,949, filed on May 10, 2021, which is a continuation of U.S. application Ser. No. 16/901,432, filed on Jun. 15, 2020, which is a continuation of U.S. application Ser. No. 13/126,866, filed on Nov. 13, 2013, which claims the priority of PCT/EP2010/058625, filed on Jun. 18, 2010, which claims priority to U.S. Provisional Application No. 61/329,148, filed on Apr. 29, 2010, and German Application No. 10 2009 027 100.7, filed Jun. 23, 2009; German Application No. 10 2009 028 626.8, filed Aug. 18, 2009; and German Application No. 10 2010 028 398.3, filed Apr. 29, 2010 the entire contents of each of which are hereby incorporated in total by reference.

BACKGROUND OF THE INVENTION

The present invention relates to a light modulator device used for a display for the presentation of two- and/or three-dimensional image contents or image sequences. The light modulator device comprises a light modulator and a control unit. The phase and/or the amplitude of a substantially collimated light wave field are alterable by the light modulator in dependence on the location on the light modulator. The light modulator is controllable by the control unit. The present invention further relates to a display and to a manufacturing method for a light modulator device.

Holographic displays comprising a spatial light modulator (SLM) with a matrix arrangement of pixels are known in prior art. For example, there are light modulators which can change or modulate the phase or the amplitude or both the phase and the amplitude (i.e. complex-valued) of the light which interacts with the SLM.

Only to give an example, reference is made to an autostereoscopic display (ASD) according to WO 2005/060270 A1, where the current eye positions of at least one observer are detected and where the stereoscopic images are deflected towards the left and the right eye of the observer, respectively, dependent on the current eye positions. This is realised by means of a backplane shutter device. As far as holographic displays are concerned, reference is made to WO 2006/066919 A1 or WO 2006/027228 A1 to give some examples. Higher diffraction orders are generated in a Fourier plane of such a holographic display. The distance between these diffraction orders is reciprocally proportional to the pixel pitch of the SLM of the display, i.e. the centre-centre distance between the periodic structures of the light modulator. For holographic displays with an observer window, a diffraction order must comprise at least the size of this observer window. The pixel pitch of the SLM is therefore to be chosen to match the desired size of the observer window. Since the observer window only has to be somewhat larger than the diameter of an eye pupil, a relatively large pixel pitch is resulting, with typical values ranging between 30 µm and 50 µm.

Moreover, however, a holographic reconstruction will only become visible if one eye of the observer is positioned in the observer window. Therefore, the observer has to remain in a fixed position, or the observer window has to be tracked to the current position of the observer eyes. For this, it is necessary to provide an eye detection device and a beam tracking device. Prior art beam tracking devices, such as the light source tracking device described in WO 2006/119920 A1 or the electrowetting cell tracking device described in WO 2008/142108 A1, are complex and costly.

It is further known in the prior art to realise the function of a field lens, which can either be provided as a separate unit or be integrated into the tracking device. This field lens function serves to focus light from different positions of the display to a desired position in an observer plane. For example, Z tracking, i.e. tracking of the observer window in the axial direction of the display (i.e. when the observer eyes move towards the display or away from the display), requires an alterable field lens function.

However, it is also possible to achieve beam tracking by software means, i.e. by way of alterable encoding, as described for example in WO 2006/066906 A1. According to that method, linear phase profiles are encoded in the pixels of the SLM, as the case may be in addition to a hologram. However, the angular range in which tracking by encoding can be reasonably used is also restricted by the pitch of the SLM. Generally, the tracking range can comprise several diffraction orders when using that method, the intensity of the tracked observer window being reduced according to the reduced intensity of the respective higher diffraction orders. A reasonable tracking range would thus typically include one or at most two to three diffraction orders.

Generally, it is also possible to use an SLM with a smaller pixel pitch. A reasonable motion range of an observer in front of a holographic display requires an angle of a few degrees. Though this would demand a pitch in a range of few micrometres. For example, a 24-inch display with a pitch of 2 µm would result in about 40 billion pixels, which would not be feasible as regards the manufacturing, the addressing and the computerised generation of real-time holographic information.

SUMMARY OF THE INVENTION

It is therefore the object of the present invention to provide and to further develop a light modulator device, a display and a method for the manufacturing of a light modulator device of the above-mentioned type such to overcome the aforementioned problems. In particular, an easily realisable method and device for tracking the observer windows of the holographic display or for tracking the sweet spots of an autostereoscopic display or for a beam deflection in multi-view displays shall be disclosed.

Regarding the light modulator device, the object of this invention is solved by the teachings of claim 1. Further preferred embodiments and enhancements of the present invention are defined in the dependent claims.

According to the invention, a light modulator device of the above-mentioned type is characterised in that in the direction of propagation of the light wave field the light modulator is followed by at least one diffraction device. This diffraction device comprises a variable diffractive structure. This diffractive structure diffracts the light wave field, which has been modulated by the light modulator, in a presettable way.

According to this invention, it has been found out initially that a tracking of at least one observer window can particularly be realised in that the light modulator is followed in the direction of the propagation of the light wave field by a diffraction device which comprises a variable diffractive structure. This can be used to alter the diffractive structure of the diffraction device according to the current eye position of an observer such that the diffraction device generates defined higher diffraction orders of the light wave field which has been influenced by the light modulator or that it deflects the light beams towards the current eye position of an observer by means of diffraction. Periodic recurrences of the light wave field which has been influenced by the light modulator are generated in the individual diffraction orders. The diffractive structure of the diffraction device has either to be set or to be controlled by a control unit such that a recurrence of the light wave field which has been influenced by the light modulator, i.e. of the observer window, is also generated at the current eye position of an observer who looks at the display. Thus, the observer can visually perceive the information written to the light modulator according to the principles described in WO 2006/066919 A1.

Generally, the diffractive structure of the diffraction device could comprise any periodic structure. Here, a two-dimensional grating structure is particularly thinkable. The preferred diffractive structure of the diffraction device is a one-dimensional grating structure or a saw-tooth structure. A substantially vertical one-dimensional linear grating structure could be realised in the diffraction device to generate a horizontally deflected periodic recurrence or diffraction orders. Since the diffraction device is also suitable to modify the phase of the light wave field, thereby locally deflecting individual portions of the light wave field, the diffraction device could also be termed a phase deflector. Generally, a one-dimensional linear grating structure with a presettable angle to the horizontal line could be realised in the diffraction device.

The diffractive structure of the diffraction device should comprise a grating period or periodic distance or gradient which is substantially in the order of the wavelength of the used light. Thus, grating periods comprising values in the range between 200 nm and 30 μm are generally taken into consideration. In this respect, the effect of the diffraction device is not exclusively that of diffracting the light which passes through the diffraction device. In particular, if the grating periods are situated in a range of more than 10 μm, for example, the effect of the diffraction device is also that of an element that modulates the phase of the light. Knowing this, the diffraction device below shall therefore be seen and understood in this context.

Preferably two diffraction devices are provided of which one diffraction device realises a vertical deflection only and the other diffraction device realises a horizontal deflection only. These two diffraction devices are designed in analogy with a phase-modulating SLM in the form of pixelated elements with a controllable phase modulation in many steps between 0 and about $2\pi$ of the wavelength of the used light, but such that the pixels are arranged in rows or in columns only.

A very fine structuring can thus be achieved in one dimension or direction (horizontal or vertical), so that a small pixel pitch (or a small grating period) can be realised so to obtain a large angular range for tracking. In the other dimension (vertical or horizontal), pixels are continuously located substantially across the entire height or width of the diffraction device (which can also realise the function of a phase deflector or a phased array).

The pixel pitch in the finely-structured direction is chosen to match the wavelengths of the light used for illumination and the desired angular range for these wavelengths.

In displays which require horizontal tracking only, for example, it is possible to use just one diffraction device. Further, it is generally possible to combine diffraction devices and other tracking devices, either in order to enlarge the tracking angle or to realise horizontal and/or vertical deflection by different methods.

In this context, the terms 'horizontal' and 'vertical' shall be understood in a generalised way such to represent two dimensions which roughly are oriented perpendicularly to each other. Generally, the entire tracking device could also be turned such that one tracking direction is the +45° diagonal, while the other tracking direction is the −45° diagonal.

Generally, any functional principles known from phase-modulating light modulators can also be employed for the diffraction devices. The following embodiments will exemplarily refer to a diffraction device based on a phase modulation by means of liquid crystals.

Due to the fine structuring in one dimension or direction only, manufacturing and addressing of the diffraction device is preferably far less complex than for example it might be for liquid cells which are arranged in a matrix (of an electrowetting cell array). For example, in a display with a screen diagonal of 24 inches and a minimum grating structure (grating period) of 2 μm, a diffraction device for realising a diffraction in the horizontal direction would only have 265,000 pixels, a diffraction device for realising a diffraction in the vertical direction even less, namely 150,000 pixels. Here, the number of pixels is lower than that of a horizontally and vertically pixelated light modulator with VGA resolution.

A binary grating with fixed diffractive structure—such as a polarisation grating—has to a large extend a fixed grating period and therefore realises a substantially fixed deflection angle. In contrast, the deflection angle or diffraction angle of the light which passes through the diffraction device can be alterably controlled in very fine steps with the alterably controllable diffraction device by altering the quantisation (i.e. the number) of phase steps and/or the slope of linear phase profiles with a multitude or a set of diffractive structures designed in the form of phase steps and writable into the diffraction device.

First, a continuous linearly increasing or decreasing phase profile could for example be computed which corresponds to a defined positive or negative deflection angle. Then, the phase values for the position of each pixel of the diffractive structure are computed modulo $2\pi$. The available phase step (quantisation) with the smallest difference to this computed value is written to the respective pixel of the diffractive structure. The computation modulo $2\pi$ automatically ensures a continuous phase profile of the light wave front.

The computation of the phase values for the diffraction device can also be considered in analogy to a blaze grating.

Based on the desired lateral position of the observer window and its distance to the display, deflection angles are determined to deflect light from a position on the display or light modulator towards the observer window.

A blaze grating is computed whose grating period corresponds to the desired deflection angle; this is done using the general grating equation:

$$\sin \alpha +/- \sin \beta = m\lambda/g$$

where $\alpha$ is the angle of incident light, $\beta$ is the angle of the light deflected by the grating and m is the diffraction order. In a blaze grating, the latter is usually m=1. Further, $\lambda$ is the wavelength of the used light and g is the grating constant of the blaze grating. The positive operator on the left-hand side of the equation shall be used when the incident light beam and the deflected light beam are situated on the same side of the perpendicular of incidence. If this is not the case, the negative operator applies.

This blaze grating is scanned, the distance of the scan points corresponding to the pixel pitch of the diffraction device, and the resultant scanned values are written to the diffraction device. According to the scanning theorem, the blaze grating can be scanned correctly if the grating period g is at least twice the pixel pitch of the diffraction device.

$$g \geq 2p$$

where p is the pixel pitch of the diffraction device.

If this condition is satisfied, it is generally possible to realise blaze gratings with any grating period. This means that adjustable deflection angles can be realised in fine steps (i.e. small tracking steps) up to a maximum angle which corresponds to the blaze grating with a grating period of twice the pixel pitch of the diffraction device.

An ideal blaze grating deflects all light into its first order. Thus, higher orders ideally would not be generated by the blaze grating itself, but only by it being scanned with the pixel pitch of the diffraction device. Supposing a non-ideal behaviour, further blaze orders can be generated as well—see for example the explanations about temperature compensation below.

Generally, higher orders of the diffraction device can be used in order to enlarge the tracking range. This is in particular possible in single-user systems. A higher order of the diffraction device would mean to use grating periods of the blaze grating that are smaller than twice the pixel pitch of the diffraction device. Despite the violation of the scanning theorem, a portion of the light in a higher order of the diffraction device will be deflected to the desired position. However, an additional, typically brighter repetition of the observer window will then also occur in the 0th order of the diffraction device. Given a sufficiently small pitch of the diffraction device, these orders are further apart than an eye separation, so that they do not disturb a single user.

Contrarily, higher orders of the diffraction device can be reduced or suppressed using a number of different methods, in particular in applications where they have a disturbing effect. To this end, the use of methods such as pixel apodisation is thinkable, e.g. as described in the hitherto unpublished documents DE 10 2008 002 692.1 or PCT/EP2009/050476.

The suppression of higher orders is in particular necessary in multi-user systems, i.e. when higher orders which occur when tracking a single observer would disturb another observer.

A light modulator is preferably combined with two separate diffraction devices. A hologram is encoded on the light modulator, where the light modulator has a relatively large pixel pitch (e.g. 30 µm×30 µm) and a horizontal/vertical matrix of pixels. The one diffraction device serves for horizontal tracking and the other diffraction device serves for vertical tracking. Each of the two diffraction devices has a fine pitch (e.g. 1 µm), but is only structured in one dimension. The range of motion of the observer becomes about as large as it was in a much more complex and costly system that comprises a single light modulator with a pixel pitch of for example 1 µm×1 µm and 160 billion pixels and that takes advantage of the tracking by encoding method.

Further, the function of a field lens can be variably controlled at least partly in the diffraction device by considering corresponding phase terms and, if applicable, prism terms. The field lens function corresponds to a deflection angle that differs locally at the individual lateral positions on the display or light modulator. In other words, it is not a periodic structure which comprises a substantially constant grating period across the entire effective surface of the diffraction device that would be written to the diffraction device here. On the contrary, it is provided to write a grating structure or diffractive structure across the entire effective surface of the diffraction device that comprises a variable grating period or diffractive structure across the entire effective surface of the diffraction device, thereby realising the function of a field lens. The pixel pitch of the diffraction device must then be chosen to be small enough for the maximum required deflection angle from the opposite edge of the light modulator or display to the observer to be situated within the used diffraction order.

According to a preferred embodiment, the display additionally comprises a field lens whose optical property is invariable. This field lens focuses the light to an average observer distance and a central lateral observer position. It can optionally be of a refractive or diffractive type, the latter for example being realised by an adequately dimensioned and positioned Bragg grating. In that case, the diffraction device is preferably arranged downstream of the Bragg grating in the optical path, because the Bragg grating requires a fix angle of incidence. In the former case, the refractive lens can optionally be arranged upstream or downstream of the diffraction device.

Tracking an observer window in a direction along the optical axis, i.e. in a direction perpendicular to the surface of the light modulator (Z tracking), could be achieved by writing phase terms which represent additional lenses to the light modulator and/or to the at least one diffraction device. A compensation of aberrations of a field lens which is provided in the display could then be realised in the at least one diffraction device and in the light modulator by way of encoding. In that case, a larger pixel pitch of the diffraction device suffices for a certain angular range for tracking than would be necessary when integrating the entire field lens function in the diffraction device and light modulator.

It must be noted in either case that in contrast to a mere deflection (prism terms) a spherical lens function (e.g. the phase terms of the entire field lens or of the additional lens for Z tracking) or an aberration correction may not be able to be fully split into two mutually independent horizontal and vertical phase profiles. As far as the lens function is concerned, this can be seen descriptively as the difference between a single spherical lens and two crossed cylindrical lenses. The phase profiles of the cylindrical lenses and of the spherical lens would only correspond in paraxial approximation, i.e. for a small lens aperture. They would differ for large lenses. This means that the horizontal phase profile on the display which is required to deflect light to a certain observer position can be different for example on the upper edge of the display than in its centre or on its bottom edge, and that the required vertical phase profile can be different for example on the left edge of the display than in its centre or on its right edge. However, not the entire phase profile could possibly be represented by the SLM alone, because the local gradient of the phase profile that can be encoded sensibly is reciprocally proportional to the pixel pitch, and the SLM typically has a rather large pixel pitch.

The phase profile φ (x,y) which is representative of the lens function or aberration correction is then preferably split up as follows:

$$\varphi(x,y) = \varphi_1(x) + \varphi_2(y) + \varphi_3(x,y)$$

where $\varphi_1(x)$ is a phase function which only depends on the horizontal coordinate and $\varphi_2(y)$ is a phase function which only depends on the vertical coordinate. These portions $\varphi_1(x)$ and $\varphi_2(y)$ are encoded or compensated in the diffraction device for horizontal and vertical diffraction, respectively, and the smaller portion $\varphi_3(x,y)$ is encoded or compensated in the light modulator.

According to a preferred embodiment of the entire holographic display device, this device includes an illumination device which comprises a light waveguide where the light which propagates through the light waveguide is coupled out evanescently by a volume grating which is deposited onto it. Such an illumination device is described for example in documents DE 10 2009 028 984.4 and PCT/EP2010/058619. This arrangement generates a substantially collimated light wave field with a specifiable polarisation. Such an illumination device can preferably be made in a very flat design. For this, the illumination device is designed and arranged such that the collimated light wave field propagates towards the light modulator. The light modulator could be made such that it modulates the light of the light wave field during transmission or reflection. Further, a component which realises the function of a field lens, such as a Bragg grating, is arranged downstream of the light modulator, seen in the direction of the propagation of the light wave field.

The illumination device is particularly preferably arranged between the light modulator and the diffraction device. This illumination device can be termed a 'frontlight' in this case. If a component is provided which realises the function of a field lens, then the illumination device is arranged between the light modulator and the component which realises the function of a field lens. In this embodiment, the light modulator is a reflection-type light modulator which can modulate the phase of the light which interacts with it. A $\lambda/4$ plate, or a comparable optical component, is arranged between the illumination device and light modulator, so that the polarisation of the light which is coupled out of the illumination device is turned by 45 degrees by the $\lambda/4$ plate or comparable optical component a first time when it propagates towards the light modulator and a second time by another 45 degrees after having been reflected by the light modulator when it passes the $\lambda/4$ plate or comparable optical component again. Consequently, the light which propagates towards the illumination device is altogether turned by 90 degrees compared with the light that is coupled out of the illumination device, so that the light which has been reflected by the light modulator can pass through the illumination device—and in particular through its volume grating—substantially without being disturbed. The illumination device, or rather the component which realises the function of a field lens, is followed by the first diffraction device, which realises a diffraction of the light either in a horizontal or in a vertical direction. The first diffraction device is followed by the second diffraction device, which realises a diffraction of the light either in a vertical or in a horizontal direction.

An illumination device in the form of a backlight can of course also be used to provide the substantially collimated light. In this case, the backlight is followed in the direction of propagation of the light wave field by a transmission-type light modulator and the two diffraction devices. A component which realises the function of a field lens could be arranged between the illumination device and the light modulator, or between the light modulator and a diffraction device. Generally, a diffraction device can also be applied in an autostereoscopic display or in a conventional 2D display where the presented image content shall be deflected towards or focused on the observer eyes only for security reasons. As a prerequisite for this, such a display must show a coherent or partially coherent illumination.

It may be necessary to compensate temperature fluctuations in the diffraction device. Caused by the generation of heat in electronic components and in the illumination device, displays often comprise a temperature gradient from their centre towards their edges. As the temperature changes, the birefringence of the liquid crystal (LC) material decreases, for example. Moreover, the elastic constants of the LC material change, which affects the orientation of the LC molecules at a given voltage. A temperature change can thus affect the phase modulation or the diffractive behaviour of the diffraction device.

While it would generally be possible to compensate this temperature gradient by adjusting the control of the pixels accordingly in a horizontally and vertically pixelated light modulator, this possibility does not exist in a row-only or column-only-type modulator or in a row-only or column-only-type diffraction device. This tends to result in the risk that for example in a vertically oriented column the centre of the column effects a different phase modulation than the upper or lower end of the column. Of course, this is not desired.

A reduced birefringence of the LC material would for example have the consequence that the actual phase decreases in proportion to the target phase. This would be equivalent to a blaze grating of wrong height, so that the $2\pi$ jumps would not be correct. This would result in the generation of higher blaze orders.

If an incorrect deflection angle occurs due to a temperature gradient, then this can be compensated within one diffraction order of the light modulator by an additional linear phase profile in the light modulator. However, it is preferred to use a device which is designed to circumvent the occurrence of a temperature gradient in that the diffraction device or the entire display are actively temperature-controlled. Insofar, a temperature correction could be realised by accordingly encoding the light modulator and/or by controlling the temperature in the diffraction device, e.g. using the Peltier effect.

When a field lens is used and arranged in the optical path such that light passes through it first, i.e. before it passes through the diffraction device, this has the effect that light can enter the diffraction device at an oblique angle, i.e. that the angle of incidence in the diffraction device varies spatially. However, this angle of incidence is known and temporally constant in a field lens with invariable optical properties. This can be used for compensation.

If the phase modulation of the diffraction device is based on a birefringent material, it must be noted that the effective birefringence varies when the light passes through at an oblique angle. At the same thickness of the phase-modulating light modulator or diffraction device, a light beam which hits the device at an oblique angle would be given a different phase modulation than a light beam which hits it at a right angle. Changing the phase modulation by way of modifying the control values is only possible to a limited extent. If the diffraction device is organised in rows, it is for example not readily possible to compensate an angle of incidence that varies from left to right by modifying the control voltage.

However, it is possible to provide a presettable and invariable thickness gradient of the phase-modulating layer. In a diffraction device that is organised in rows, the thickness of the LC layer would increase or decrease slightly from the centre towards at least the left and right edges, typically by 10 percent if the light is incident at an angle of 20 degrees. If two crossed diffraction devices are arranged one after another, the light will also fall from the first to the second diffraction device at a variable oblique angle. The required tracking range is usually larger in the horizontal direction than in the vertical direction. The diffraction device for the vertical direction is thus preferably arranged first in the optical path, because then the angles of incidence on the subsequent diffraction device for the horizontal direction are smaller than if the two were arranged vice versa.

As far as the oblique direction of incidence on the diffraction device is concerned, the angle of incidence can also be compensated in the direction of deflection by modifying the operation voltage of the diffraction device. If the light is incident at such an angle, it is generally possible that a ray of light cross-talks to a neighbouring pixel of the diffraction device. Cross-talking can be minimised in that the layer thickness of the LC layer is reduced, e.g. by using materials with high birefringence. If the oblique angle is known, this can generally be compensated by structured electrodes on either substrate and/or by a staggered arrangement of electrodes on either substrate of the diffraction device.

Further, a compensation of an oblique passage through the diffraction device can be achieved thanks to the possibly provided component which realises the function of a field lens in that the thickness of the LC layer is adapted to the diffraction device or in that both substrates of the diffraction device have an accordingly staggered arrangement of electrodes. This is possible because the component which realises the function of a field lens comprises at any position a presettable and therefore known angular deflection of the light which passes through it. Insofar, the angle of incidence is known for a presettable position on the diffraction device.

As far as the operation of the diffraction device is concerned, TFT displays typically have one transistor per pixel, said transistor being arranged in that pixel. If the display has a small pixel pitch, as can be the case in the diffraction device with a pitch of 2 µm, the transistors may be wider than individual rows or columns. The control circuits with thin-film transistors (TFT) can be accommodated on the substrate thanks to a staggered fanned-out design at the edges of the display panel. Alternatively, chip-on-glass (CoG) circuits can be applied to the substrate in order to control the electrodes.

According to a preferred embodiment, the diffraction device is designed such that a presettable grating-type diffractive structure can be adjusted or written to the diffraction device which extends in one dimension only. In other words, the diffractive structure which is written to the diffraction device is merely a linear grating structure. This grating structure can have binary or discrete or continuous profiles or mixed forms in individual sections.

The diffraction device is preferably designed such that the periodicity of the diffractive structure which is adjusted by the diffraction device is variable.

As far as the design aspect is concerned, the diffraction device could comprise substantially parallel linear electrodes which are deposited onto a first substrate. The electrodes could thus have the form of stripes. The first substrate or one substrate of the diffraction device could have a planar electrode which is isolated from the substantially parallel electrodes on the substrate. The diffraction device could comprise a second substrate which is arranged at a distance from the first substrate. The second substrate could have a planar electrode and/or multiple substantially parallel linear electrodes. If the second substrate comprises multiple substantially parallel linear electrodes, then these electrodes could be arranged substantially opposite or at a presettable lateral offset to the linear electrodes of the first substrate. The orientation of the electrodes of both substrates would be substantially parallel to each other.

According to a preferred embodiment, at least one intermediate electrode layer is provided between two substrates in order to enable the electrodes of the light modulator device to realise an electric field distribution with which for example a substantially saw-tooth-shaped profile can be generated with an almost vertical falling edge—similar to the drawing shown in FIG. 3. The intermediate electrode layer comprises electrodes. Depending on how the intermediate electrode layer is designed in detail, electrodes can be deposited onto at least one surface of the intermediate electrode layer. It is particularly preferred to provide four intermediate electrode layers between two substrates. The at least one intermediate electrode layer is preferably aligned parallel to a surface of a substrate. Both the electrodes which are deposited onto the substrates and the electrodes of the intermediate electrode layer can be individually addressed electrically so to realise a defined electric potential profile which comes as close as possible to a specified or desired ideal potential profile between the two substrates.

The electrodes of the intermediate electrode layer are substantially of linear shape, arranged substantially parallel to each other and oriented in a presettable direction, comparable to the arrangement of the electrodes on the at least one substrate. Here, the electrodes of the intermediate electrode layer could have a grating period which corresponds substantially to the grating period of the electrodes which are arranged on one substrate.

According to a preferred embodiment, the distance between a substrate and a neighbouring intermediate electrode layer and/or between two neighbouring intermediate electrode layers can be specified. This distance could be a fraction of the distance between two neighbouring electrodes or a fraction of the grating period of the electrodes of the substrate or of the intermediate electrode layer. To give an example, the width of the electrodes across the longitudinal direction of the electrodes could be 1 µm, the distance between two neighbouring electrodes could be 1 µm, the distance between the first substrate and the neighbouring intermediate electrode layer could be 0.5 µm and the distance between the intermediate electrode layer and the neighbouring intermediate electrode layer could again be 0.5 µm.

Insofar, in this example, the distance between a substrate and a neighbouring intermediate electrode layer or between two neighbouring intermediate electrode layers is smaller than the distance between two neighbouring electrodes, namely it is only half as large, and it could be even smaller.

Generally, the parallel linear electrodes of the first and/or those of the second substrate and/or those of an intermediate electrode layer could be oriented in a presettable direction. Further, the orientation of the parallel linear electrodes of the first substrate could be arranged under a defined angle to the orientation of the parallel linear electrodes of the second substrate, said angle ranging between 0 and 90 degrees. The angle preferably has a value of substantially 0 degrees. However, it could also be sensible that the angle has a value of for example 10 degrees. Alternatively or additionally, the orientation of the parallel linear electrodes of one substrate could be arranged under a defined angle to the orientation of the parallel linear electrodes of an intermediate electrode layer, said angle ranging between 0 and 90 degrees, but preferably being 0 degrees. Further details will be given below.

According to a preferred embodiment, multiple electrodes of a substrate or of an intermediate electrode layer are combined to form a segment. The electrodes which are combined to form a segment are commonly addressed in at least one operational situation of the diffraction device. Such addressing could in particular include a substantially simultaneous switch-off or setting of a presettable electric potential in the electrodes of a segment. According to this embodiment, multiple segments can be provided per substrate or intermediate electrode layer. Such an embodiment can particularly preferably be used in conjunction with a segmented illumination device (scanning backlight or scanning frontlight), where individual segments (stripe-shaped regions) are switched on and off or scanned sequentially. Here, it can be necessary to provide the diffraction device or light modulator with a "scanning off" feature that is synchronised with the "on" and "off" operations of the segmented illumination device. The electrodes 26 of the first substrate of the diffraction device are for example arranged at an angle of 80 degrees to the "off-state" linear electrodes 72 (which could be deposited onto the second substrate), and they can be addressed e.g. in 5 individual groups, as shown schematically in FIG. 19. This diagram shows in a simplified manner the electrodes 26 of the first substrate (not shown in FIG. 19) at an angle of 90 degrees to the "off-state" electrodes 72 of the second substrate (not shown in FIG. 19) which are combined to form segments 74. Referring to FIG. 19, the numerals 1 to 20 and the designation $U_{PG}$ indicate that different presettable voltages can be applied to the individual electrodes 26. The numerals 1 to 5 and the designation $U_{OFF}$ in the lower part of FIG. 19 indicate that a common voltage can be applied to the electrodes 72 of a segment 74. Since the scanning of the illumination device typically takes place in synchronism with the writing of pixel contents to the light modulator, the "off-state" electrodes 72 are preferably grouped into segments which can be addressed in synchronism with the segments of the light modulator which are to be written. Accordingly, the resultant area of the "off-state" electrodes 72 of a segment could be formed such that it is arranged substantially overlapping with the area of a segment of the illumination device. Alternatively, the "off-state" electrodes 72 can be designed and/or grouped into segments according to the subsequently written and subsequently illuminated segments of the light modulator. In an off-state-field-driven light modulator, the "off-state" linear electrodes can also be arranged parallel to the scanning direction of the illumination device, which serves to prevent the F-comb structure of the "off-state" electrodes 72 (i.e. a structure where the "off-state" electrodes 72 are oriented substantially perpendicular to the electrodes 26), which is for example shown in FIG. 19.

In order to be able to realise large absolute values of the components of the electric field which run parallel to the substrate surfaces (plane field), the following exemplary layer structure is provided: first substrate|planar ITO electrode|100 nm dielectric|individually addressable linear electrodes 26|50 nm dielectric|an LC layer, e.g. 3 μm thick|50 nm dielectric|"off-state" electrodes 72 which are turned by 80 degrees in relation to the electrodes 26 and which can be addressed in groups 74|100 nm dielectric|planar ITO electrode|second substrate (cover glass plate).

Here, the substantially parallel linear electrodes of the first and/or those of the second substrate and/or those of an intermediate electrode layer could be oriented substantially parallel to each other. To this end, it will have to be made sure during the manufacturing of the light modulator device according to this invention that the electrodes which are arranged in the individual layers or deposited onto the individual substrates are always aligned perfectly parallel to each other.

The electrodes of the first and/or second substrate are transparent for the used light. The first and/or second substrate is transparent for the used light. The refractive index of the electrodes is preferably substantially identical to the refractive index of the substrate. In other words, the electrode material and the substrate material are chosen or provided such that they show substantially the same refractive index. This is in particular provided for the light of the used wavelengths.

According to a preferred embodiment, a material which is able to realise local changes in the refractive index for at least one direction of the polarisation of the light by way of modulating a material-affecting control factor is arranged between the first and the second substrate, and/or between a substrate and a neighbouring intermediate electrode layer, and/or between two neighbouring intermediate electrode layers. The material-affecting control factor could be electric voltage or current, upon whose variation the orientation and/or optical property of the individual elements of the material will change accordingly. The material could for example comprise liquid crystals or a polymer layer—in particular a polyimide layer—with liquid crystals or with oblong nanoparticles. In particular, the nanoparticles could include metallic carbon nanotubes or nanoparticles comprising a permanent electric dipole distribution. Further, nanoparticles of any shape could be used which show birefringence for the used light and which can be spatially oriented for example in an electric field.

If the light modulator device has at least one intermediate electrode layer, the material could include a relatively stable and appropriately designed polymer film with liquid crystals or oblong nanoparticles in the spaces in the polymer film, where the electrodes of the intermediate electrode layer are deposited directly onto this polymer film during the production process. The polymer film may have to be coated with a thin protective layer if necessary before the electrodes of the intermediate electrode layer can be deposited onto this protective layer in order to prevent the electrically conductive material of the electrodes of the intermediate electrode layer from diffusing into the polymer film. Alternatively, the material could be a flexible or highly-viscous transparent layer with mixed-in or included nanoparticles.

The oblong nanoparticles could for example be realised in the form of metallic ellipsoids which have a size of less than $\lambda/2n$, where $\lambda$ is the wavelength of the used light and n is the refractive index of the medium or material in which the metallic ellipsoids are embedded. The metallic ellipsoids and the embedding medium would insofar represent the above-mentioned material. The metallic ellipsoids have an electric dipole. Free electrons of the dipole cannot oscillate in a direction which is perpendicular to the major axis of the dipole in the electric field which is induced by the incident light. In a direction parallel to the major axis of the dipole, however, the electrons of a metallic ellipsoid can oscillate, thereby causing plasmon resonance. Insofar, substantially parallel-oriented metallic ellipsoids represent a form of anisotropy. Given a suitable concentration of the metallic nanoparticles in the embedding medium, birefringence can be realised by the metallic ellipsoids and their embedding medium, said birefringence being dependent on the orientation of the metallic ellipsoids. A comparable functional principle is provided by metallic carbon nanotubes whose geometry can be adjusted by varying process parameters during production accordingly. The length of the metallic carbon nanotubes is also chosen to be less than λ/2n. Comparably, metal molecules of that size with two major axes which differ substantially in length could be used as well.

Specifically, liquid crystals could be arranged between the first substrate and the second substrate and/or between a substrate and a neighbouring intermediate electrode layer and/or between two neighbouring intermediate electrode layers, where the orientation of said liquid crystals can be influenced in that a presettable electric voltage is applied to the electrodes. The electrodes of the first and/or second substrate preferably have insulating layers so that the liquid crystals do not come in electric contact with the electrodes. The insulation layer shall also be chosen such that its refractive index comes as close as possible to that of the electrodes and/or that of the substrate, and that the insulation layer is transparent for the used light. The insulation layer can additionally serve to level out any height differences which are caused by applying the electrode material to the substantially plane substrate. Finally, the insulation layer could again form a substantially plane surface neighbouring the liquid crystal layer.

For a diffraction device which is based on liquid crystals, the latter can for example be designed similar to an electrically controlled birefringence SLM (ECB-SLM). Typically, during the absence of an electric field, the liquid crystals are oriented such to be substantially parallel to the substrate, caused by their surface forces. An orientation is established during production (e.g. by rubbing mechanically) in this plane parallel to the substrate. For this, a layer could be provided which gives the liquid crystals a preferred orientation, e.g. by way of mechanically applying appropriate depressions (for example by way of brushing).

In a diffraction device with linear electrodes, the LC molecules are preferably oriented at the substrate surface to be parallel to the longitudinal direction of the electrodes, because this enables sharper transitions of the LC orientation states between neighbouring electrodes when applying a voltage.

In an arrangement which is based on the control of liquid crystals, where the dimension of the electrodes has the same magnitude as the thickness of the LC layer which is required for a phase modulation of $2\pi$, the case may occur that the liquid crystals are not fully independently controlled through the individual electrodes. For example, the phase value which is realised at a certain position in the direction of diffraction does not only depend on the voltage applied to the electrode, but also on the voltage applied to at least one neighbouring electrode.

In contrast to a phase-modulating SLM, where each pixel is typically addressed independently such that this pixel realises a certain phase value, it is proposed in an embodiment of this invention to realise blaze gratings of different periods to determine the voltage values of each set of electrodes that correspond to one grating period once such that they generate the desired phase profile. These voltage values can be held available e.g. in a memory for addressing. An arrangement of the electrodes at the opposing substrates as shown in FIG. 7 can be particularly helpful for this.

The diffraction device serves in particular to generate diffractive structures with which local phase changes of the light which interacts with the diffractive structures of the diffraction device can be realised (phase grating). It could be problematic to realise small periods of the diffractive structures, because only few electrodes, e.g. just five electrodes, may be arranged in a confined space to achieve a presettable phase setting of the diffraction device in a certain operational situation. A preferred example of a diffractive structure or presettable phase setting is a saw-tooth profile, which can be realised for example by the liquid crystal layer of the diffraction device. This is shown in FIG. 8. The electrode arrangement shown in FIG. 8 compares to that of FIG. 5, i.e. a planar electrode 32 is arranged on top and linear electrodes 26 are arranged opposite in a plane $E_1$ (the substrates are not shown in FIG. 8). $\varphi(x)$ is an exemplary phase profile of the liquid crystal layer which will be obtained for the light which passes through the diffraction device if a certain distribution of voltages is applied to the electrodes 26 against the potential $U_c$ of the electrode 32.

If the electrodes are a rather wide, e.g. if the electrode-space ratio is raised from 0.5 to 0.8, so that the electrodes cover 80% of the period, it would be possible to realise a less stepped phase ramp on the one hand, but the region of the $2\pi$ phase shift or $2\pi$ step, which is denoted by the reference letters PS in FIG. 8, would be less steep than indicated in FIG. 8 on the other. This form of general, locally undifferentiated and not variably adjustable smoothing represents a low-pass filter, i.e. it reduces the highest spatial frequency of the synthetic, variable phase grating that can still be represented.

A buried second layer of transparent electrodes 54, which is arranged in a plane $E_2$ and which comprises for example the same distance and the same or different electrode-space ratio as the first electrode layer, can be used purposefully to obtain a smoothing of the stepped profile at such loci at which a phase ramp shall be realised while simultaneously maintaining the sharp edge of the $2\pi$ shift. This is shown in FIG. 9.

In the region of the preferably linearly rising edge of the saw-tooth phase step, the electrodes 54 in plane $E_2$ are for example supplied with the mean voltage of the voltages of its two adjacent electrodes of plane $E_1$. However, those electrodes 54 of plane $E_2$ which are situated directly below the $2\pi$ shift to be realised are excluded from this rule. They are supplied with a voltage $U_{2\pi}$ which is chosen such to realise an edge that is as sharp as possible.

The advantage of a second, buried electrode comb structure is that at the resolution limit of the possibly used contact-copy lithography lines can be applied which are almost twice as wide as the line widths which would be required if both electrode comb structures laid in a common plane.

According to a preferred embodiment, the electrode layer at the upper substrate (not shown in FIG. 10) is also realised in the form of two stacked electrode comb structures in two planes $E_3$ and $E_4$. This is shown in FIG. 10. Compared to the embodiment illustrated in FIG. 9, this design serves to obtain steeper edges in the regions of phase shifts. The electrodes 26, 54 are for example made of indium-tin oxide (ITO) and embedded in highly refractive glass, such as SF66, so not to act optically as phase gratings.

In other words, electrodes are preferably arranged at at least one substrate of the diffraction device in at least two different planes which are parallel to a surface of the substrate. The electrodes which are arranged in the different planes can be arranged at a lateral offset. The size of the electrodes and/or their mutual distance can differ or be substantially identical.

According to a particularly preferred embodiment, the electrodes of the diffraction device are controlled such that an electric field distribution is obtained in the diffraction device which realises at least regionally a saw-tooth-shaped refractive index distribution with a presettable periodicity. This can be achieved for example in that in respect of one direction the neighbouring electrodes are supplied with different electric voltages. Consequently, an electric field is generated between the two substrates of the diffraction device which influences the material which is arranged between the two substrates such that a saw-tooth-shaped refractive index distribution is obtained. This is an active state in which two- and/or three-dimensional image contents are generated.

Further, it could be provided that in preparation for another active state, in which the diffraction device comprises a different diffractive structure, the electrodes of the diffraction device are operated such that an electric field distribution is obtained in the diffraction device which realises a substantially flat refractive index distribution. To achieve this, neighbouring electrodes of a substrate could be supplied with electric voltages such that the electric field lines run for example from a positively charged electrode to the two neighbouring negatively charged electrodes—and not to the oppositely arranged electrode of the other substrate. Consequently, an electric field distribution is obtained with the electric field lines having a relatively small angle to the substrate surface, so that in a central region between the two substrates resultant electric field lines are obtained which are oriented substantially parallel to the surfaces of the two substrates. This is an inactive state in which no two- and/or three-dimensional image contents are presented. The material which is arranged between the two substrates can thereby preferably be turned into a defined neutral state very quickly, from which the material can be turned back into an active state in which a different diffractive structure is realised.

In order to be able to quickly obtain a presettable diffractive structure or refractive index distribution for the next active state with view to realising a high refresh rate, according to a preferred embodiment the electrodes of the diffraction device are controlled already when setting a substantially flat refractive index distribution such that an electric field distribution is obtained which prepares for the refractive index distribution that has to be generated next. This could for example be achieved in that the electrodes which are situated at positions at which a great refractive index difference or phase shift is to be realised are supplied with a voltage such that a desired refractive index distribution is prepared or already partly obtained at these positions—already in the inactive state.

In order to be able to obtain a diffractive structure very quickly, the electrodes of the diffraction device are initially and temporarily supplied with a higher electric voltage than would be necessary to adjust the desired refractive index distribution. The electric voltage is then reduced to values which are necessary to adjust the desired refractive index distribution.

A light modulator device for the presentation of two- or three-dimensional image contents may require short response times of the diffraction device and of the light modulator. Now, possibilities will be described which aim to reduce the response times of the diffraction device and of the light modulator so that it becomes possible to use a light modulator which does not comprise a refresh rate of 150 Hz or more.

To present colour image contents, the light modulator and the diffraction device could for example be supplied sequentially with light of different wavelengths, e.g. with light of the primary colours red, green and blue. The diffraction device is then synchronously adjustable to the respective illumination situation.

According to a preferred embodiment, the light modulator could be controllable by the control unit such that information for a left or a right eye is written to the—entire—light modulator. The light wave field which is accordingly modulated for the left or a right eye by the light modulator can then be deflected to the respective left or right eye of at least one observer by the diffraction device. The information for the left or the right eye is sequentially written to the light modulator.

Alternatively, the light modulator could have first and second regions, e.g. columns, to which information for a left and a right eye can be written respectively. The first and second regions of the light modulator are assigned to respective first and second regions of the diffraction device. The light modulator and the diffraction device can be controlled such that the light wave field which is affected by the first regions of the light modulator, i.e. which is substantially modulated by information which is written to the first regions of the light modulator, is deflected by the first regions of the diffraction device towards a left eye of at least one observer. The light wave field which is affected by the second regions of the light modulator, i.e. which is substantially modulated by information which is written to the second regions of the light modulator, is deflected by the second regions of the diffraction device towards a right eye of the at least one observer.

The first and second regions of the light modulator are alternating and repetitively arranged to each other. Alternatively or additionally, the first and second regions of the light modulator are oriented vertically, they are in particular columns of the light modulator.

Colour filters could be assigned to the individual pixels of the light modulator and/or colour filters could be assigned to the individual regions of the diffraction device.

In particular, the light modulator could be followed by a diffraction device for a substantially horizontally effective beam deflection. A means, e.g. a suitable diffuser foil, is provided which serves to widen an illuminated region—a so-called sweet spot—in a vertical direction.

It is thus generally possible that the light modulator and diffraction device are sequentially illuminated with light of different wavelengths while a diffractive structure which is adapted to the light of the respective wavelength is written to the diffraction device in synchronism with that, so to obtain the same or a presettable deflection angle for these wavelengths. The image contents which correspond to light of the respective wavelengths to the light modulator can also be written sequentially for these wavelengths in synchronism with that.

Alternatively, a light modulator with spatial colour multiplexing, i.e. with colour filters, can be used. The image contents which are to be presented can be written to the light modulator synchronously for light of multiple wavelengths or depending on the illumination situation or in a single encoding process. This allows the combination of a light modulator with a longer response time and a diffraction device with a shorter response time. The light modulator can for example have a refresh rate of 120 Hz and the diffraction device can have a refresh rate of 360 Hz. The individual pixels of the light modulator can thus be assigned to colour filters, where those colour filters of the pixels preferably correspond to the typically used primary colours, e.g. red, green and blue. Information is written to the pixels of the light modulator, namely in the general case irrespectivly of their particular colour assignment. The light modulator is sequentially illuminated with light of different wavelengths—corresponding to the colour filters in the primary colours—preferably when the writing operation for all pixels of the light modulator is completed. The modulation of the illumination is possible in the kHz range, it is thus not the temporally limiting factor. The individual pixels of the light modulator act according to their respectively assigned colour filters. The diffraction device is then operated in synchronism with the respective illumination situation.

According to a preferred embodiment, the writing operation is carried out depending on the colour assignment. First, information is written to all pixels of one primary colour, then, sequentially, to the pixels of the other primary colours, in the same order as the subsequent illumination with light of the primary colours. For example, all red pixies are addressed first, then all green ones, and finally all blue ones. After that, all red pixels are illuminated, then all green ones, and finally all blue ones. The control matrix of the three primary colours of the RGB light modulator can be understood as an interleaving of three monochromic light modulators, which are addressed temporally with a phase lag of $2\pi/3$, i.e. which are mutually shifted to each other temporally by one third of the refresh rate. The available response time, i.e. the period of time from when the pixels are addressed until they are illuminated with light of the respective primary colour, during which the pixels can adapt to their desired modulation state, thereby preferably has a minimum value which corresponds to the writing and illuminating time of the other colours.

If one or multiple diffraction devices is/are provided whose electrode structure only comprises substantially parallel linear electrodes, then space division multiplexing is possible as well, for example with the help of diffractive structures in the diffraction device which are adapted to the light of different wavelengths. Without prejudice to the generality of the invention, a horizontal deflection only will be considered in the following. In that case, certain spatial regions of the diffraction device are assigned to certain columns of the light modulator. Now, a diffractive structure is written to the individual spatial regions of the diffraction device such that light of the corresponding pixel column of the light modulator is deflected by a certain angle. Light of neighbouring red, green and blue pixels can for example be deflected by the same angle as the diffractive structures in the individual spatial regions of the diffraction device are adapted accordingly. It is further possible to deflect image contents which are meant to be provided to a left and a right eye of an observer by different angles. In the latter case, information for the left and for the right eye of an observer can be written simultaneously to the light modulator by way of space division multiplexing. In the case of colour multiplexing, it is also possible that both the light modulator and the diffraction device comprise colour filters. This allows to almost completely eliminate cross-talking of the pixel columns of the light modulator to spatial regions of the diffraction device which are not assigned to the respective pixel column of the light modulator.

Multiplexing can also be carried out in that parts of a pixel column of the light modulator are assigned to different sections of the diffraction device. For example, light from a left half of a pixel column can be deflected in a certain direction by a spatial region of the diffraction device which is assigned to it, while light from a right half of a pixel column can be deflected in a different direction by another spatial region of the diffraction device which is assigned to it. This method can be used to present identical image contents to the same eye of multiple observers. Instead of a spatial division into regions of the diffraction device which are assigned to respective pixel columns, it is optionally also possible to write a superposition of multiple deflection functions to the diffraction device. Such a superposition will generally result in a complex-valued deflection function. However, the latter could be approximated by a phase function for the purpose of writing it to a phase-modulating diffraction device. This approximation can be realised using known methods, such as iterative Fourier transformation (IFTA). Alternatively, a diffraction device can be used which diffracts the light by modulating both its amplitude and phase. Diffraction by modulating both amplitude and phase can also be realised in that two diffraction devices are arranged one after another, where their electrode structure comprises substantially parallel linear electrodes, and where the one diffraction device modulates the amplitude of the light and the other diffraction device modulates the phase of the light. If the diffraction devices are based for example on the use of liquid crystals, then a modulation of either amplitude or phase can be achieved by choosing a suitable polarisation of the light, e.g. by using polarisers and/or retardation plates.

Another possibility for the light modulator to present the same image content to the same eye of multiple observers—i.e. to multiple left eyes or to multiple right eyes—is to combine a light modulator with a lower refresh rate with a diffraction device with a higher refresh rate again. While substantially unchanging information—e.g. a hologram or stereo image for the left eye—remains written to the light modulator, the diffraction device deflects light to the positions of the respective eyes of the individual observers one after another.

Further, the various ways described above to multiplex colours and observer eyes in time or space division can also be combined with each other. A light modulator with a refresh rate of 120 Hz and colour filters could for example be used together with a diffraction device having a refresh rate of 720 Hz. Information for the left eye would be written to the light modulator and three different colours of the light would be deflected sequentially to the left eyes of two observers one after another by the diffraction device. Subsequently, information for the right eye would be written to the light modulator, which would then be illuminated sequentially with light of the individual colours, and the light of the individual colours would be deflected to the right eyes of two or more observers one after another by the diffraction device in synchronism with the illumination situation. In that case too can the information for the right eye and blue colour, for example, already start to be written to the light modulator while red or green light is still being directed to the left eyes.

A further diffraction device is preferably arranged downstream of the diffraction device, seen in the direction of propagation of the light wave field. A diffractive structure can be adjusted in this further diffraction device comprising a predefined periodicity having a direction or structure that differs from the direction or structure of the periodicity of an adjusted diffractive structure of the (first) diffraction device that follows the light modulator. This makes it possible to realise tracking in a different direction than is possible with the first diffraction device.

The two diffraction devices can be arranged in relation to each other such that the predefined direction or structure of the periodicity of the diffractive structure of the (first) diffraction device is substantially perpendicular to the predefined direction or structure of the periodicity of the diffractive structure of the further diffraction device. Specifically, the first and the second diffraction device can each comprise a substrate with substantially parallel linear electrodes which are oriented in a predefined direction. The two diffraction devices are arranged in relation to each other such that the linear electrodes of the first diffraction device are substantially perpendicular to the linear electrodes of the second diffraction device. The electrodes of the two diffraction devices can be situated in substantially parallel planes.

According to a preferred embodiment, the substantially parallel linear electrodes of the diffraction device are oriented at an angle to the horizontal linear such that a distribution of the light which is diffracted by the diffraction device is generated in an observer plane that widely suppresses the occurrence of light intensities in the eyes of an observer which are situated next to observer eyes with a visibility region. This is of particular importance where the light modulator device according to this invention is used for a display for the presentation of holographic three-dimensional image contents which works according to the principles described in document WO 2006/0669191 A1. Here, a three-dimensional scene which is encoded on the light modulator device can be reconstructed holographically with at least partly coherent light for at least one observer. The observer will perceive the reconstruction, or three-dimensional scene, if the position of his eyes correspond to the observer plane in the visibility region which has been generated for his position. Now, if the observer moves to change their distance to the display or if they move laterally in front of the display, the visibility region will be tracked to their new position. To be able to do so, a position detection system detects the position of the observer eyes, and thus determines the deflection angles of the pencils of rays in relation to the optical axis of the display towards the observer eye, and updates the position information. The position detection system is connected to the light modulator through control means. The visibility region of a detected observer eye is generated for a region between two neighbouring diffraction orders and thus between two neighbouring light source images. This is to prevent that an intensity peak is situated in this eye and disturbs the observer when watching the reconstruction. The shape of the opening of the modulator cell determines the distribution of the entire intensity of a light source to its individual generated light source images. Generally, cross-talking of the intensities or the perception of diffraction orders in an eye that is situated beside the currently generated visibility region may be possible. However, it is possible to minimise or to fully suppress this effect using a number of approaches. A similar effect could be induced by at least one diffraction device which is arranged downstream of the light modulator, and such effect shall also be minimised or suppressed. This can preferably be achieved by appropriately orienting the electrodes at a presettable angle in relation to the horizontal line.

The light modulator and/or the diffraction device comprise a periodic structure with a predefined periodicity in at least one direction. The light modulator typically has a matrix structure, i.e. a grating structure in two different dimensions. In contrast, the diffraction device preferably has a periodic structure in just one dimension. Specifically, it is provided that the light modulator and the diffraction device have a periodic structure with a predefined periodicity. The periodicity of the diffraction device is smaller than or identical to that of the light modulator. The periodicity of the diffraction device could for example be smaller than the periodicity of the light modulator by a factor comprising a value within a range of between 2 and 150.

The diffraction device comprises individual diffraction elements in which binary, discrete or continuous values can be set. These values could in particular correspond to predefined orientations of the liquid crystals, which affect according phase changes in the light which passes through the respective diffraction element of the diffraction device. The set or written values of the diffraction elements of the diffraction device form the diffractive structure. A diffraction element could in particular be an electrode and the LC material arranged next to that electrode.

The function of a field lens for the display could be realised in that predefined phase terms are written to the diffraction device. Alternatively or additionally, a focussing optical component could be provided which realises the function of a field lens for the display. The focussing optical component could be a Bragg grating with a presettable property.

As already mentioned briefly above, a temperature compensation mechanism could be provided which comprises an active temperature controller with at least one temperature sensor and at least one thermodynamic element, for example a Peltier element. A Peltier element can be used locally for cooling, heating and/or temperature measurement (U(T)). Alternatively or additionally, a temperature compensation could be realised in that a presettable phase profile is written to the light modulator.

A presettable deflection angle for light of different wavelengths would also be settable if the light modulator and the diffraction device were illuminated sequentially with light of the different wavelengths. In synchronism with that, a diffractive structure which is adapted to the currently used wavelength is written to the diffraction device. This can be done for the three primary colours red, green and blue, thus making possible a colour presentation of the image contents with that display.

The diffraction device is preferably arranged next to the light modulator. A possibly provided further diffraction device is then arranged next to the first diffraction device. In this context, the term 'next to' shall in particular be understood such that no further optical component is arranged between the light modulator and the diffraction device or between the two diffraction devices or that the respective components are arranged in spatial proximity to each other. Spatial proximity could refer to a distance of between 0 and 10 mm. It is further thinkable that at least two of the following components are designed in the form of a sandwich: the light modulator, the diffraction device and the further diffraction device. In this case, one component is deposited directly onto the other component during the manufacturing process. Individual components of the sandwich could have a common element, in particular a common substrate. The component which realises the function of a field lens could also be integrated into the sandwich.

As regards a display, the above-mentioned object is solved by the teachings of the claims. The display according to this invention is characterised by a light modulator device according to one the claims. The display is designed such that stereoscopic image contents and/or stereoscopic multi-view image contents and/or holographic image contents can be presented. Such a display (3D display) is able to show three-dimensional image contents in a three-dimensional way for perception by the human eye. As regards possible embodiments of the light modulator device, it is referred to the description above to avoid repetition.

3D displays preferably offer the possibility to switch between a 3D mode and a 2D mode, where conventional two-dimensional image contents can be transmitted and presented in the 2D mode.

It is generally thinkable to continue to realise tracking in the inventive 3D display and, in respect of the presented contents, to replace the information of the 3D scene by a 2D image content. However, switching to a 2D display mode would preferably be realised such that a fixed large visibility region is generated, so that no tracking of a small observer window to the current position of the observer eye is necessary.

Two possibilities of 3D-2D switching will therefore be proposed here:

a) An additional optical device is provided which comprises a switchable diffusing medium. This medium is transparent in the inactive 'off' state. In the active 'on' state, the medium comprises a diffusing effect. The switchable diffusing medium can for example be polymer dispersed liquid crystals (PDLC). The additional optical device could be arranged at the side of the display that faces the observer, quasi as the last optical component of the display. In the active state of the optical device, the diffraction device would have to be deactivated. This would realise the 2D mode of the 3D display. If the optical device is deactivated, and the diffraction device is activated, then the 3D display is in the 3D mode. If this possibility is made use of, an additional component will thus be necessary in the arrangement.

The second preferred possibility is:

b) The diffraction device itself is switched between two operating modes. In the one operating mode (3D mode), the diffraction device is operated such that it deflects light specifically to a particular position. In the other operating mode (2D mode), the diffraction device is operated such that it comprises a diffusing function. To be able to realise this, an encoded diffuser function is necessary. This can be realised for example by a random phase distribution or by a specifically optimised phase distribution which is written instead of a continuous grating by respectively controlling the diffraction device. If two crossed diffraction devices are used, then the first one is used for horizontal control and the second one is used for vertical control.

Full-parallax holograms or single-parallax holograms are used in holographic displays. Single-parallax holograms represent a simplification as regards the computing and encoding process. Among other benefits, single-parallax holograms allow an illumination device to be used which only shows coherence in the encoding direction or parallax direction. An observer window can be generated in the one direction (the encoding direction), while a sweet spot is generated in another direction (perpendicular to the former)—see for example document WO 2006/027228 A1 for details.

A diffraction device usually requires coherent light for tracking. However, it is not necessary that there is coherence across the entire surface area of the diffraction device. It is rather sufficient to ensure correct function of the diffraction device if there is coherence across few periods of the grating.

It is thus proposed to design an illumination device, taking advantage of the known van-Cittert-Zernike theorem, with view to dimensions, properties and in particular to an angular spectrum as regards the distribution of the Poynting vectors of the light which is emitted by the illumination device such that—to enable tracking in a device that employs single-parallax hologram encoding—partial coherence is achieved in a diffraction device perpendicular to the encoding direction such that multiple grating periods of the diffraction device are still illuminated widely mutually spatially coherently, while individual pixels of the SLM are illuminated widely mutually incoherently. This allows tracking with coherent light to be carried out while still being able to generate a sweet spot.

If the SLM had a pixel pitch of for example 50 µm, and the diffraction device had a pitch of for example 2 µm, it would be possible to illuminate about 25 grating periods of the diffraction device coherently, but adjacent pixels of the SLM widely incoherently.

As regards the manufacturing method for a light modulator device, the above-mentioned object is solved by the teachings of the claims. The method according to this invention serves for the manufacturing of a light modulator device according to the claims. The manufacturing process comprises the following process steps:

Coating a first substrate with electrodes

Deposition of a material layer onto a surface of the first substrate

Deposition of a second substrate which is coated with electrodes, wherein the two substrates are aligned to each other such that the parallel linear electrodes of the first substrate are oriented substantially parallel to the parallel linear electrodes of the second substrate.

In step b), a thin polymer film which includes liquid crystals, carbon nanotubes or elliptic metallic nanoparticles could be laminated to the substrate.

Now, a further material layer, e.g. a further polymer film, could be laminated on top of that in step e).

Further, the following process steps could be comprised:

An intermediate electrode layer containing electrodes is deposited onto the material layer after completion of step b)

A further material layer is deposited onto the intermediate electrode layer.

f) Steps d) and e) could be performed at least once again.

Here, the first substrate and the at least one intermediate electrode layer could be aligned to each other such that the parallel linear electrodes of the first substrate are arranged substantially parallel to the parallel linear electrodes of the intermediate electrode layer.

A lift-off process could be used to deposit electrodes onto a substrate in process step a) or to a material layer in process step d). Alternatively, electrodes could also be deposited in that an electrically conductive film is deposited from a liquid or gaseous phase onto the substrate or material layer. A photoresist is laminated, sprayed or applied in a centrifugal process. The photoresist is exposed with a striped pattern. This exposure can be done e.g. in the form of a contact copy. The stripes can also be created in the form of a dual-beam interference pattern, for instance. The exposed photoresist is developed e.g. with KOH (AZ Hoechst). The bare lines of the conductive layer are etched away with a solution. Remaining photoresist is detached using remover. The gaps between the electrodes could for example be filled in that a non-conductive, sufficiently transparent material is deposited from a liquid or gaseous phase.

If a polariser is to be provided in the plane of the electrodes of a substrate of the diffraction device, said polariser being a wire grid polariser which runs substantially parallel to the electrodes, multiple lines or electrically conductive structures of the wire grid polariser can be bonded with a common contact, so that e.g. three or four lines together form an electrode of the diffraction device. The resultant electrodes can be bonded to be addressed electrically either from one end or from two opposing ends.

Alternatively, ITO electrode lines can be applied parallel to the wire grid polariser lines on top of these wire grid polariser lines and in electric contact with these wire grid polariser lines. This could be done for instance with the help of section-wise exposure (stitching), where the overlay error of 15 nm, which is standard in semiconductor manufacturing, does not necessarily have to be observed. Rather, an overlay error of 150 nm to 250 nm is sufficient for the manufacturing of the ITO electrode lines proposed here. This has the advantage that the conductivity of the ITO electrode lines and the lines of the wire grid polariser, which are in electric contact to the former, is substantially higher than that of the ITO structures alone, thus allowing for higher switching frequencies, in the range of >1 kHz, for instance.

The advantage of using a wire grid polariser as electrodes of a diffraction device is that its electrical conductivity is greater than the electrical conductivity of ITO, and that an amplitude or phase modulation would not be noticeable in the far field of a holographic display in the form of light which exists in the individual diffraction orders. Together with ITO, there is a higher electrical conductivity, or the option to use interrupted lines of the wire grid polariser as well.

The following explanations are related to the feature that a substrate of the diffraction device has a planar electrode which is isolated from the substantially parallel linear electrodes and/or to the feature that the substantially parallel linear electrodes of the first substrate are oriented at a presettable angle to the substantially parallel linear electrodes of the second substrate or intermediate electrode layer, said angle lying between 0 and 90 degrees, preferably being 0 degrees. Hereby, a configuration of LC molecules can be switched on or off very quickly to achieve certain LC modes, or the orientation of the LC molecules can be extended beyond a typically given angular range. Since the following explanations do not only apply to a diffraction device in the context of the present invention, the following explanations shall also refer to light modulators, SLM and/or LC displays in the broader sense.

For instance, the response time, i.e. the delay until a desired orientation of the LC molecules is achieved in a pixel of the display panel, is a key parameter when using LC displays; it determines at which refresh rates the display can be run. It is often important to have a switch-off time that is as a fast as the switch-on time.

Typically, only one of these processes—switching on or switching off—is driven by an electric field. The LC molecules are commonly given a preferred orientation through an alignment layer. If power is switched on, then the LC molecules will for example be oriented as induced by an interaction of the dielectric anisotropy of the LC material with the applied electric field. The speed of this process can be affected by the field strength.

If power is switched off, then the electric field will disappear and the LC molecules will turn back to the preferred orientation that is determined by the alignment layer (relaxation). The speed of this relaxation is usually only determined by material properties of the LC material, such as its viscosity, and it is mostly slower than the orientation in the switch-on phase.

However, faster LC response can be achieved with an arrangement where both processes—switching on and switching off—are triggered by an electric field. If in the switch-off phase a field is applied which induces an orientation that is substantially parallel to the preferred orientation of the LC molecules, then both processes—field and inherent relaxation—work together. The field supports and accelerates the re-orientation to the preferred orientation.

Insofar, a suitable electrode arrangement shall thus be described which allows electric fields to be applied which induce the LC molecules to be turned out of their preferred orientation in the switch-on phase on the one hand and to be turned back to their preferred orientation in the switch-off phase on the other hand.

Further, it is for example also possible to use a conventional electrode arrangement if instead of the dielectric coupling an interaction of the flexo-electricity type is employed which depends linearly on the field and where the direction of rotation of the LC molecules will change if the sign changes. This is described for example in document WO 2008/104533. However, somewhat more intricate electrode arrangements are required if the dielectric interaction, which has an effect that is squared with the field, is sign-independent, as is the case in most LC displays.

As regards the embodiments of the light modulator device according to this invention, the grid of linear electrodes can for example generate a saw-tooth-shaped phase profile in the diffraction device. The saw-tooth profile can be set through a variable out-of-plane orientation of the LC molecules caused by a corresponding out-of-plane field between the first and second substrate. The linear electrode arrangement also allows an in-plane field to be applied. The latter serves to accelerate the switch-off process in that the LC molecules are turned back to their in-plane orientation that is determined by their preferred orientation.

Other types of diffraction devices or light modulators, which are based for example on principles such as in-plane switching (IPS) or fringe-field-switching (FFS LM mode) take advantage of an in-plane rotation of LC molecules in the field combined with a preferred orientation, which is also in-plane. In such cases, the principle of an in-plane field for fast switch-off as described above cannot be applied directly.

In their publication "Fast-response liquid-crystal displays using crossed fringe fields", Journal of the SID, 16/10 2008, p. 1069-1074, Yan Li et al. describe an amplitude-modulating light modulator where electrodes are arranged at an upper and at a lower substrate at an angle of 60 degrees to each other. The preferred orientation of the LC molecules is inclined by 10 degrees to the electrodes on the lower substrate. This determines a direction of rotation in the switch-on phase. To realise an amplitude modulation, the LC molecules are required to rotate by maximum 45 degrees in their plane. If the molecules are turned by 45 degrees, then they are almost parallel to the electrodes on the upper substrate, but still comprise a small angle of about 5 degrees to it. A fringe field on the upper substrate then accelerates the re-orientation of the molecules.

An electrode arrangement shall thus be described which realises fast switch-off and which is suitable to be used with these LC modes such as IPS, FFS, and in particular with phase-modulating light modulators or with diffraction devices.

In a phase-modulating light modulator or display with in-plane orientation of the LC molecules it is necessary that the LC molecules can be rotated in an angular range of 180 degrees if a phase modulation of up to $2\pi$ is to be realised. Approaches to solve this problem have been described in document DE 10 2009 059 095.1, which shall be included in full here by way of reference. One approach involves switchable alignment layers. However, this requires an additional special material layer to be processed during the manufacturing of an LC display panel to be able to realise this switchable alignment layer. Insofar, it would be desirable to realise a large angular range for the orientation of the LC molecules with standard components in an LC display.

The problems mentioned here can be solved with a light modulator or a diffraction device which comprises an LC layer between two substrates. The light modulator or the diffraction device preferably serves for the phase modulation of circularly polarised light through substantially in-plane rotation or orientation of the LC molecules. The light modulator or the diffraction device comprises substantially parallel linear electrodes which are deposited onto the first and to the second substrate. Further, the orientation of the parallel linear electrodes of the first substrate has a presettable angle to the orientation of the parallel linear electrodes of the second substrate, said angle ranging between 0 and 90 degrees.

The angle of the in-plane LC orientation can be fine-adjusted through an electric field by adequately controlling the electrodes on the first substrate. The angular range for the orientation of the LC molecules can be enlarged and/or the restoration or switch-off phase can be accelerated as the LC molecules will return to their preferred orientation faster in an electric field by adequately controlling the electrodes on the second substrate. A substrate of the diffraction device or of the light modulator could have a planar electrode which is isolated from the substantially parallel electrodes.

This will be explained with the help of two embodiments. FIG. 17 (a) is a top view that shows the striped electrode arrangement, namely of the electrodes 26, on the first substrate 28, and the preferred orientation R of the surface alignment layer and thus the orientation of the LC molecules 70 during the absence of an electric field. This orientation is inclined by a small angle φ—10 degrees in this example—to the perpendicular to the longitudinal direction of the electrodes 26. This determines a counter-clockwise direction of rotation of the LC molecules 70 when an electric field is applied.

To achieve phase modulation, the rotation is realised by a preferably large angle so that the LC molecules 70 can come parallel to those of the first (or lower) substrate 28 if a strong field is applied. This operating state is shown in FIG. 17 (b). The electrodes 72 on the second (e.g. upper) substrate 30 are arranged such that they are inclined by a small angle—e.g. φ—to the longitudinal axis of the LC molecules for that maximum angle of the LC molecule orientation. If a field is applied to the electrodes 72 on the upper substrate 30, then the LC molecules 70 will quickly return to the state that is illustrated in FIG. 17 (a). In particular, in this case the accelerated switch-off can be realised either globally or for example also row by row in a light modulator or diffraction device.

The electrodes 26 on the first substrate 28 must be discretely addressable in a diffraction device or be addressable pixel-wise in a light modulator in order to create a desired phase profile or pixelated phase values. However, the electrodes 72 on the second substrate 30 can for example use a common control signal which switches back an entire row of a light modulator or the entire diffraction device to an identical preferred orientation of the LC molecules. In particular, a diffraction device typically uses very finely structured electrodes 26 on the first substrate 28, because a small electrode pitch allows larger diffraction angles to be realised. In contrast, the electrodes 72 on the second substrate 30 can preferably comprise a more coarse structure, because they are not directly related to the diffraction angle.

Insofar, the orientation of the parallel linear electrodes 26 of the first substrate 28 has a presettable (small) angle φ to the preferred orientation R of the surface alignment layer. The orientation of the substantially parallel linear electrodes 72 of the second substrate 30 comprises an angle β to the orientation of the electrodes 26 of the first substrate 28, where said angle β can for example be 90 degrees minus φ.

Another option of supporting fast restoration of the preferred orientation of the LC molecules 70 would be to apply an out-of-plane field briefly between the electrodes 26, 72 of the respective substrates 28, 30 which turns the LC molecules 70 out of the plane, but then accelerates the restoration of their preferred orientation compared with a mere in-plane relaxation process.

These arrangements can also be combined with a switchable preferred orientation as described in document DE 10 2009 059 095.1, which is used to achieve a larger angular range for the rotation of the LC molecules. FIG. 18 is a top view that shows an embodiment which realises an enlarged angular range for the rotation or orientation of the LC molecules 70 by combining the electrodes 26, 72 with a static surface alignment layer. It is preferably suitable for a light modulator and requires a pixel-wise addressing of the electrodes 26, 72 on the two respective substrates 28, 30. FIG. 18 (a) is a top view that shows the electrodes 26 on the first substrate 28 and the preferred orientation R of the static surface alignment layer, in this case as in FIG. 17 (a). FIG. 18 (b) is a top view that shows the electrodes 72 on the second (upper) substrate 30. The orientation of the LC molecules 70 can be changed by an angle ψ to the perpendicular to the electrodes 26 of the first substrate 28 by applying an electric field to the electrodes 72 of the second substrate 30. The latter are then arranged in relation to the electrodes 26 on the first substrate 28 such that if an electric field is applied a different direction of rotation—here clockwise—is possible, as shown in FIG. 18 (c). Switching on is thus realised in that optionally a voltage is applied to the second substrate 30 (as indicated by the lower LC molecule 70 in FIG. 18 (b)) or not (as indicated by the upper LC molecule 70 in FIG. 18 (b)), so that a direction of rotation is selected by a choosing a different initial preferred orientation of the LC molecules 70. The desired total rotation angle of the LC molecules 70 is then fine-adjusted by the electrodes 26 on the first substrate 28. Switching off or the restoration of the preferred orientation of the LC molecules 70 can additionally be accelerated by applying an electric field to the second substrate 30. This way, the useable angular range for the orientation of the LC molecules can be enlarged without any active or variable surface alignment layer.

BRIEF DESCRIPTION OF THE DRAWINGS

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings. The Figures are schematic drawings, where

Identical or comparable parts are given like numerals in all Figures.

DETAILED DESCRIPTION OF THE INVENTION

Figure 1:
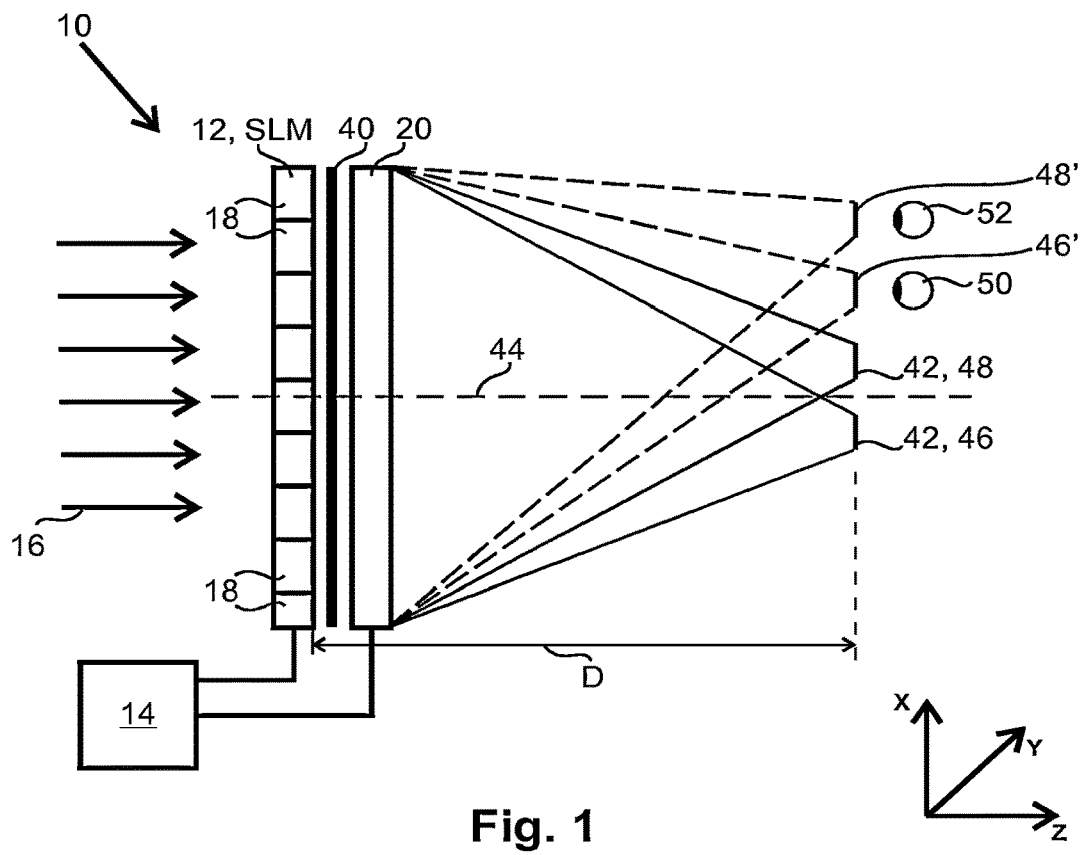
FIG. 1 is a top view that shows a first embodiment of the present invention.

FIG. 1 shows a light modulator device 10 for a display (not shown in the Figures) for the presentation of two- and/or three-dimensional image contents. The light modulator device 10 comprises a light modulator 12 (SLM) and a control unit 14. The light modulator 12 is illuminated by a collimated light wave field 16, which is indicated by the arrows in FIG. 1. The phase and/or amplitude of a collimated light wave field 16 can be varied by the light modulator 12 in dependence on the location on the light modulator 12. For this, the light modulator 12 comprises individual pixels 18 (magnified in the drawing), which are arranged in a matrix. The light modulator 12 is operated by the control unit 14. According to this invention, at least one controllable diffraction device 20 is arranged downstream of the light modulator 12, seen in the direction of propagation of the light wave field 16. The diffraction device 20 is also operated by the control unit 14; however, it could alternatively be operated by a separate control unit. The diffraction device 20 comprises a variable diffractive structure, depending on how the diffraction device 20 is actually operated. This diffractive structure variably diffracts the light wave field 16, which has been modulated by the light modulator 12, in a presettable way.

Figure 3:
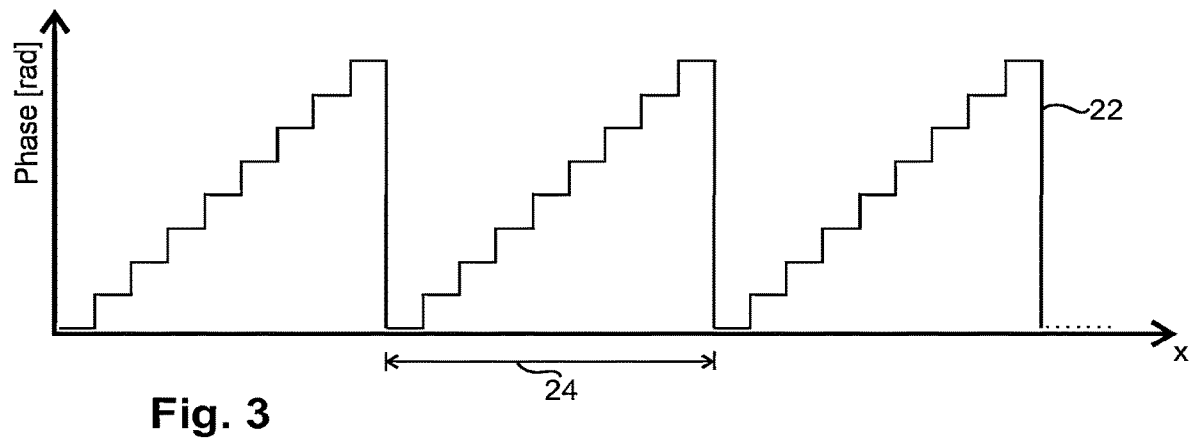
FIG. 3 is a schematic diagram that shows an exemplary diffractive structure which is written to the diffraction device.

FIG. 3 is a schematic diagram that shows an exemplary diffractive structure 22 which is written to the diffraction device 20. Here, the phase shift which is given to the light wave field 16 by the diffraction device 20 is shown as a function of the pixels or location in the horizontal direction (X direction) of the light modulator 12. The diffraction device 20 is designed such that the periodicity of the diffractive structure 22 set by the diffraction device 20 is variable. Specifically, the periodicity 24 of the diffractive structure 22 can be enlarged or reduced. Moreover, the form of the diffractive structure 22 is variable. This makes it possible to write for example a rectangular function, a saw-tooth function, a sine function or another presettable function to the diffraction device 20, either in an exact or approximated way, by way of discrete steps or continuously, depending on the specific design of the concretely used diffraction device 20.

Figure 4:
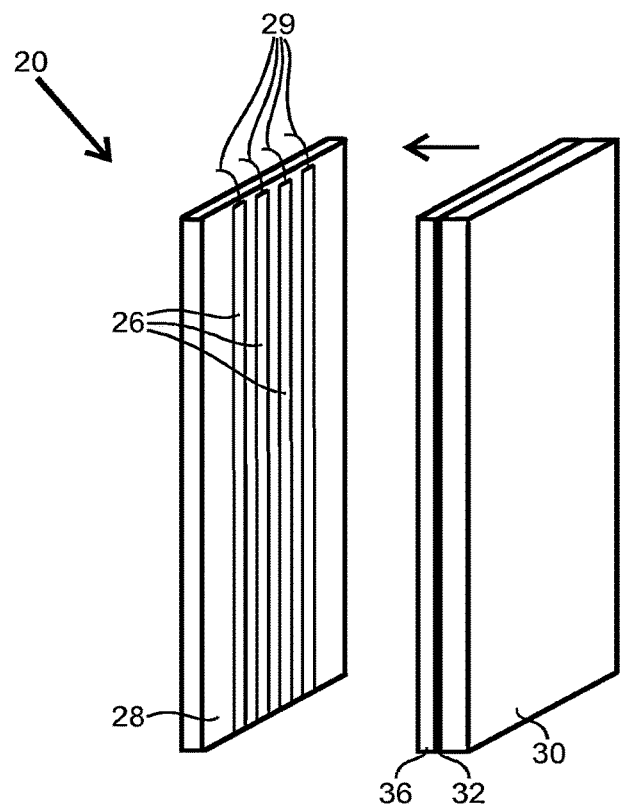
FIG. 4 is a partial exploded view of a first embodiment of a diffraction device that illustrates its design.

FIG. 4 is a partially exploded view which shows an embodiment of a diffraction device 20 with substantially parallel linear electrodes 26. The electrodes 26 are arranged at a first substrate 28 and extend substantially across the entire length of the substrate 28. The upper ends of the electrodes 26, or of the first substrate 28, are provided with contacts 29 for the electrodes 26 which serve to connect the electrodes 26 electrically and through which they can be supplied with an electric voltage by a control unit (not shown in FIG. 4). The diffraction device 20 comprises a second substrate 30 which is arranged at a distance from the first substrate 28. The second substrate 30 has a planar electrode 32.

Figure 5:
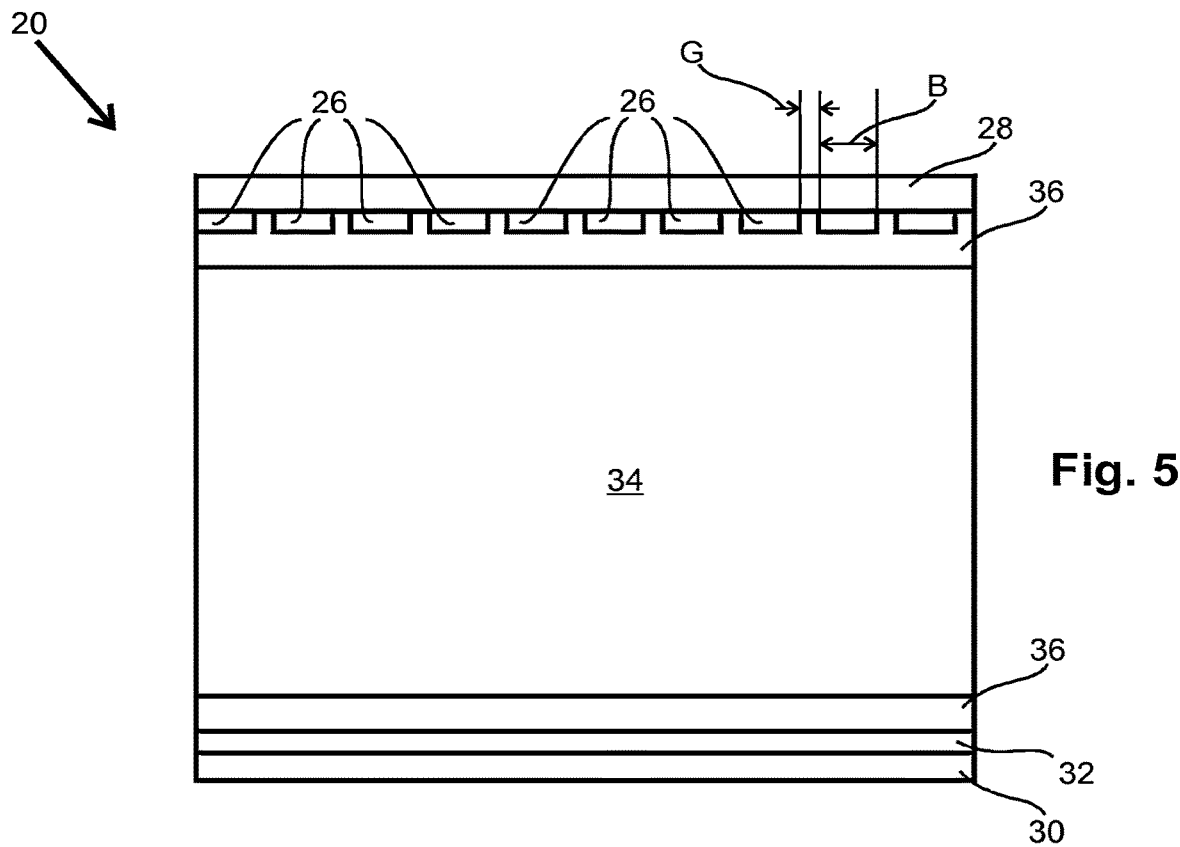
FIG. 5 is a sectional view that shows a detail of the diffraction device of FIG. 4.
Figure 6:
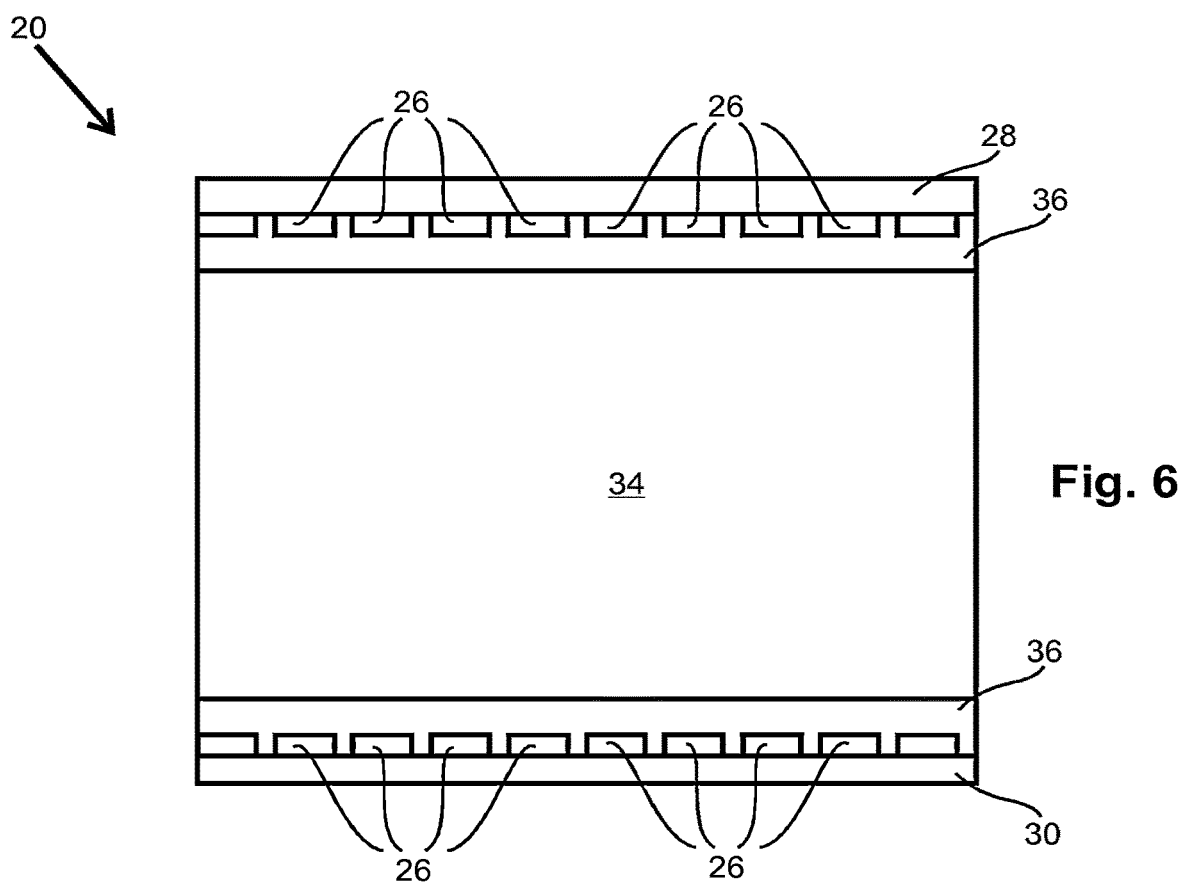
FIG. 6 is a sectional view that shows a detail of a further embodiment of a diffraction device.

FIG. 5 is a sectional view of the diffraction device 20, where the diffraction device 20 shall be understood to continue to the left and to the right, or to either side, such that the diffraction device 20 covers the entire width of the light modulator 12 which is shown in FIG. 1. The linear electrodes 26 which are arranged at the first substrate 28 have a width B of 1.5 µm in this embodiment. The width of the gap G between two neighbouring electrodes 26 is 0.5 µm. It is possible for the electrodes 26 and gaps between neighbouring electrodes 26 to have widths which differ from the above-mentioned values, this depends in particular on the intended application of the display and on the concret design of the light modulator 12. FIG. 6 is a sectional view of another embodiment of a diffraction device 20, where linear electrodes 26 are provided both on the first substrate 28 and on the second substrate 30 here.

Figure 7:
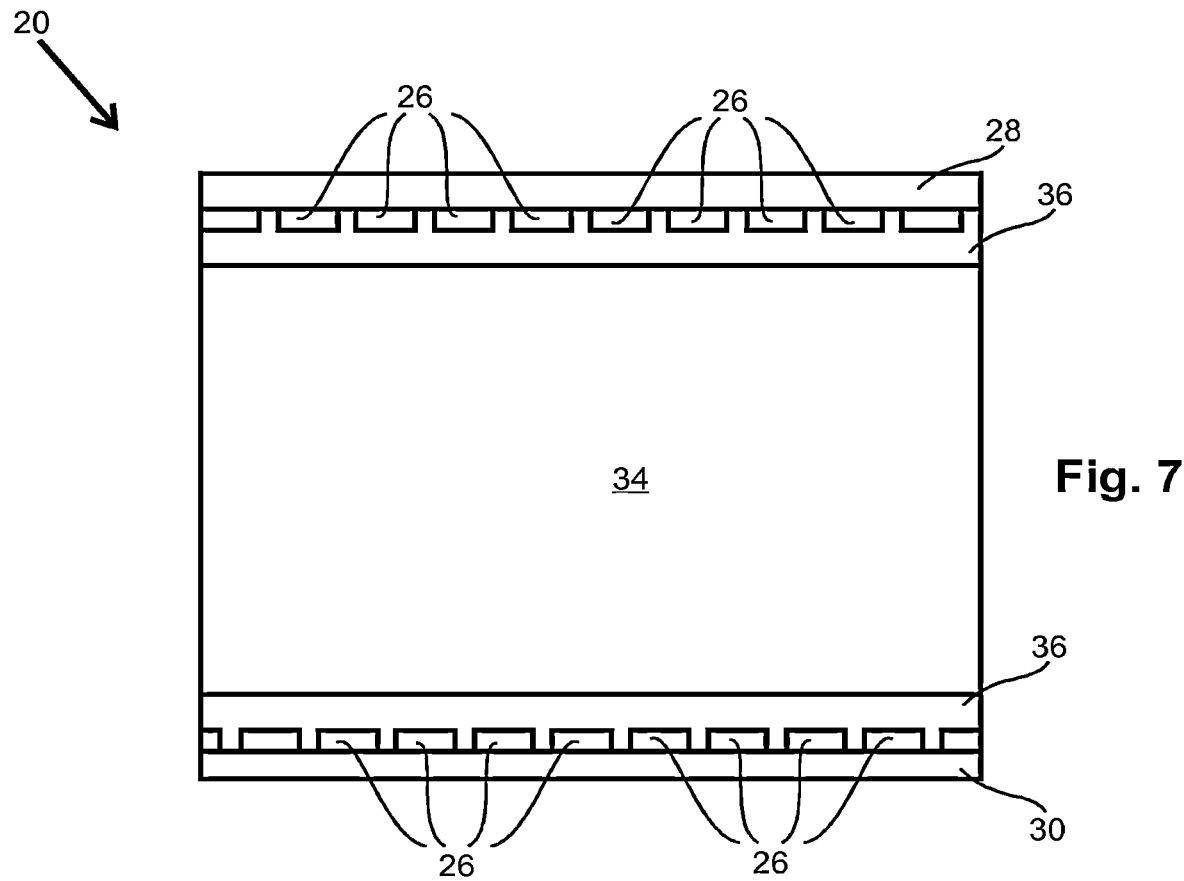
FIG. 7 is a sectional view that shows a detail of a further embodiment of a diffraction device.
Figure 8:
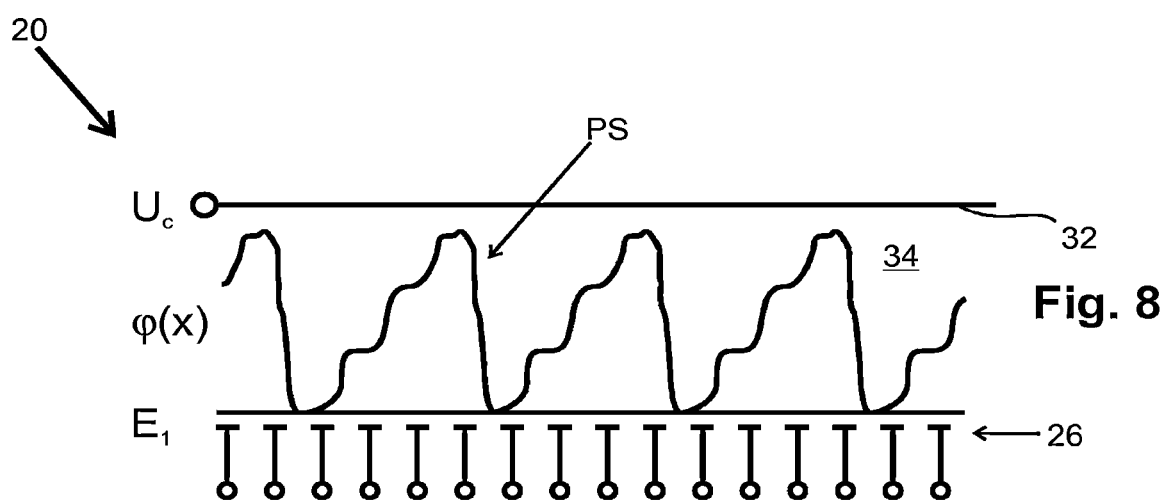
FIGS. 8 to 11 are side views each showing a detail of further embodiments of a diffraction device and the phase shift that can be controlled with them.
Figure 9:
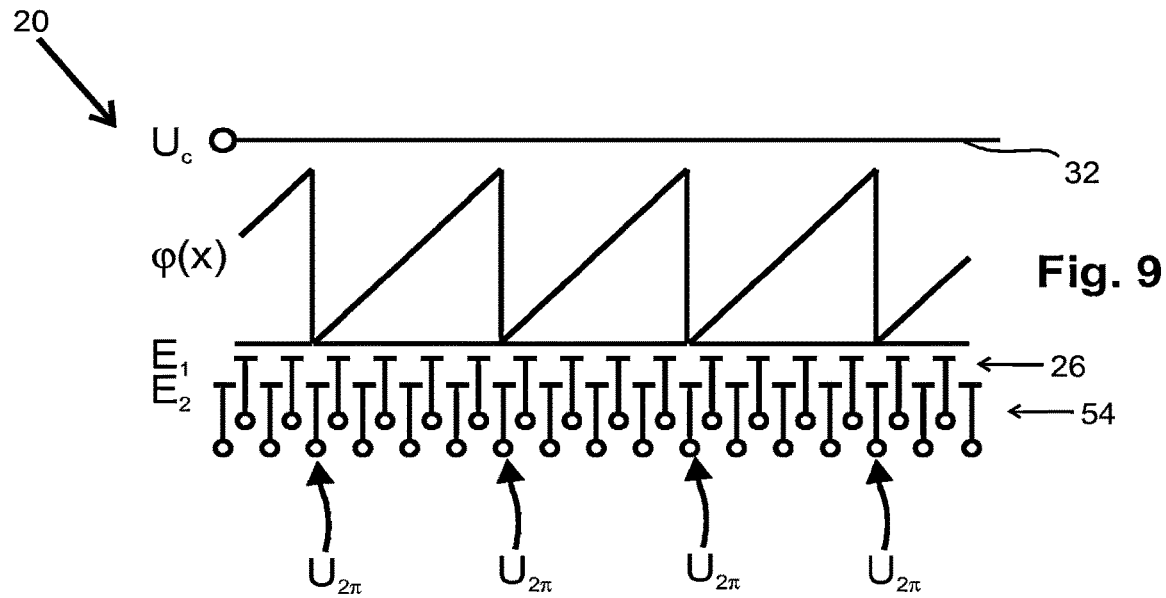
Figure 10:
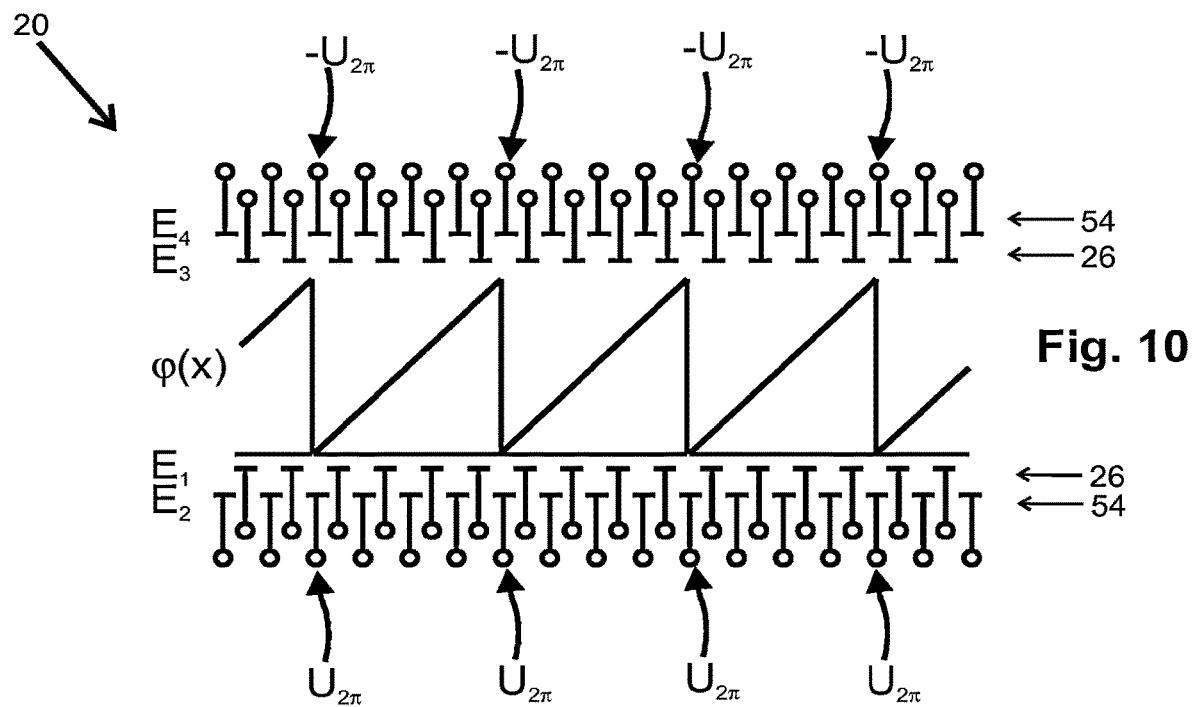

FIG. 7 is a sectional view of another embodiment of a diffraction device 20 whose design substantially compares to that of the diffraction device 20 of FIG. 6. However, in the diffraction device 20 which is shown in FIG. 7 the linear electrodes 26 which are arranged at the upper substrate 28 are laterally shifted to the linear electrodes 26 which are arranged at the lower substrate 30.

A layer 34 with liquid crystals (LC) is provided between the first substrate 28 and the second substrate 30 of the diffraction device 20 shown in FIGS. 5 and 6. The orientation of the liquid crystals can be affected in that a presettable electric voltage is applied to the electrodes 26. The reference numeral 36 denotes an insulation layer which serves to prevent an electric contact between the liquid crystals and electrodes 26 and 32.

The electrodes 26, 32 of the first and second substrate 28, 30 are transparent for the used light. The same goes for the first and second substrate 28, 30. The refractive index of the electrodes 26, 32 is substantially identical to the refractive index of the substrates 28, 30. Further, the refractive index of the electrodes 26, 32 is substantially identical to the refractive index of the insulation layer 36.

Figure 2:
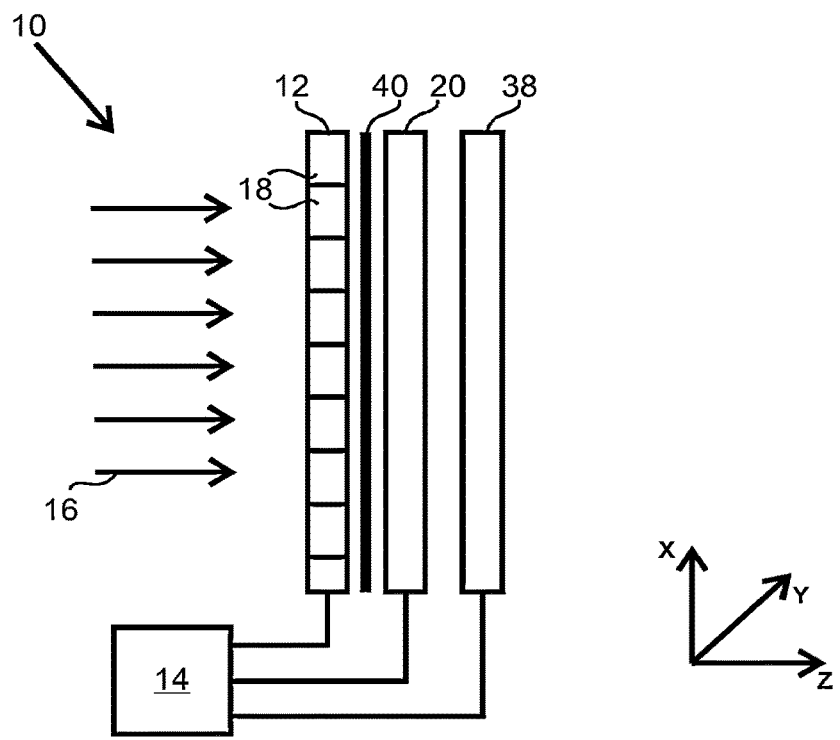
FIG. 2 is a top view that shows a second embodiment of the present invention.

FIG. 2 shows another embodiment of a light modulator device 10 according to this invention, where the first diffraction device 20 is followed by another diffraction device 38 in the direction of propagation of the light wave field 16. In this further diffraction device 38, a diffractive structure can be adjusted with a periodicity which has a direction Y or structure that differs from the direction X or structure of the periodicity 24 of an adjusted diffractive structure 22 of the (first) diffraction device 20 that follows the light modulator 12. Specifically, the two diffraction devices 20, 38 can be arranged in relation to each other such that the direction X or structure of the periodicity 24 of the diffractive structure 22 of the (first) diffraction device 20 is substantially perpendicular to the direction Y or structure of the periodicity of the diffractive structure of the further diffraction device 38. Consequently, the first diffraction device 20 realises tracking to the eyes of an observer in the horizontal direction X, while the second diffraction device 38 realises tracking to the eyes of an observer in the vertical direction Y.

The first and second diffraction device 20, 38 both have a substrate with substantially parallel linear electrodes 26. The two diffraction devices 20, 38 are arranged in relation to each other such that the linear electrodes 26 of the first diffraction device 20 are substantially perpendicular to the linear electrodes 26 of the second diffraction device 38. The light modulator 12 and the first and second diffraction device 20, 38 are controlled by the control unit 14.

The light modulator 12 and the diffraction device 20 have a periodic structure with a presettable periodicity, where the periodicity of the diffraction device 20 is smaller than the periodicity of the light modulator 12. Specifically, the periodicity of the diffraction device 20 is 2 µm, subject to the control and concret design. The periodicity of the light modulator is 50 µm both in the horizontal and in the vertical direction. It is also possible to use a relatively prime period in order to circumvent Moire effects.

The electrodes 26 of the diffraction device 38 can be understood as single diffractive elements in which—in interaction with a part of the liquid crystal layer 34—discrete or continuous values are set by applying presettable electric voltages.

In the displays shown in FIGS. 1 and 2, a field lens function of the display can be realised in that a focussing optical component 40 is provided in the form of a Bragg grating. This component focuses or deflects the light beams of the light wave field 16 which pass through the light modulator 12 towards the central observer positions 42. The central observer positions 42 are arranged in symmetry to the central axis 44 of the light modulator device 10 and at a distance D to the light modulator 12 The central observer positions 42 comprise two observer windows 46, 48. The diffraction device 20 makes it possible to realise a lateral tracking of the observer windows 46, 48 to the current position of observer eyes 50, 52 in that corresponding diffractive structures 22 are written to the diffraction device 20. The tracked observer windows are denoted by the reference numerals 46' and 48'.

The display which includes a light modulator device 10 as shown in FIG. 1 or 2 and/or which is designed according to the claims can specifically be designed such that stereoscopic and/or stereoscopic multi-view image contents and/or holographic image contents can be presented.

Figure 11:
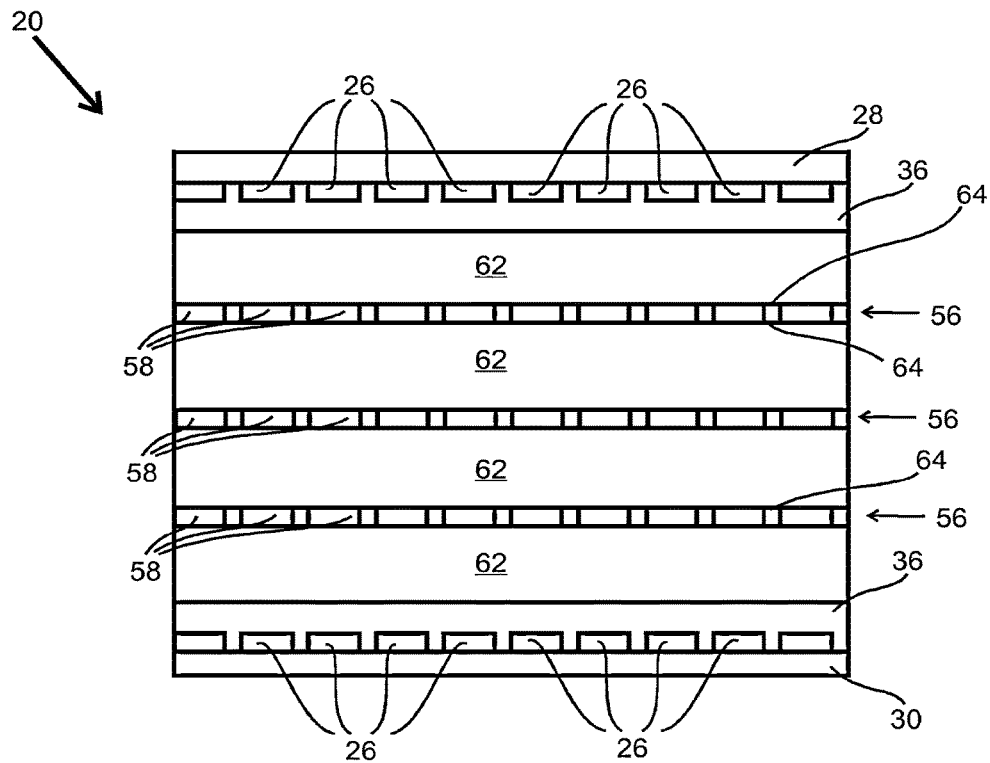

FIG. 11 is a side view of another embodiment of a diffraction device 20 whose design substantially compares to that of the diffraction device 20 of FIG. 6. However, the diffraction device 20 shown in FIG. 11 features three intermediate electrode layers 56. Each intermediate electrode layer 56 comprises multiple electrodes 58, whose width, distance and arrangement substantially compares to the width, distance and arrangement of the electrodes 26 which are arranged at the first substrate 28 and, as the case may be, on the second substrate 30. A material 62 which comprises a polyimide layer is arranged between the first substrate 28 and the neighbouring intermediate electrode layer 58. The polyimide layer is designed such that it has a substantially shape-invariant structure on the one hand and that it includes spaces (not shown) in which liquid crystals are arranged on the other hand. By applying electric voltages to the individual electrodes 26 or 58, the liquid crystals, which are freely movable in the polyimide layer, can be oriented according to the electric field distribution of the resultant electric field and, consequently, affect the light which passes through the diffraction device 20. The material 62 is also arranged between the individual intermediate electrode layers 56 and between the second substrate 30 and the neighbouring intermediate electrode layer 56. Continuous lines indicate insulation layers 64 which prevent the electrode material of the electrodes 58 which is deposited in a coating process from diffusing into the material layer 62 during the manufacturing process of the diffraction device 20 according to this invention.

The electrodes 58 of the intermediate electrode layers 56 can be arranged in the respective intermediate electrode layer 56 at a lateral offset to the electrodes of the first and second substrate 28, 30. Again, it is possible that the width and distance between the individual electrodes 58 of at least one intermediate electrode layer 56 is chosen to be different from the width and distance between the electrodes 26.

Figure 12:
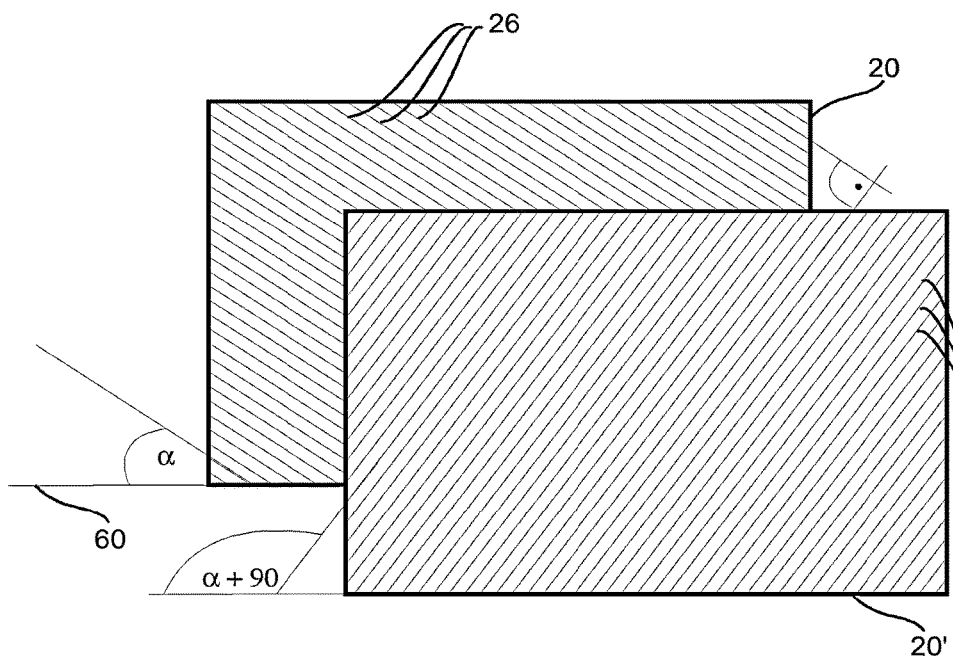
FIG. 12 is a schematic diagram that illustrates the orientation of the electrodes of a first and a second diffraction device.

FIG. 12 is a schematic view that illustrates an embodiment of an orientation of the electrodes 26 of a first diffraction device 20 relative to that of the electrodes 26 of a second diffraction device 20'. The electrodes 26 of the first diffraction device 20 are oriented at an angle α=55 degrees to the horizontal line 60. The electrodes 26 of the second diffraction device 20 are oriented at an angle of ++90 degrees=145 degrees to the horizontal line 60. The electrodes 26 of the first diffraction device 20 are thus oriented at right angles to the electrodes 26 of the second diffraction device 20'. In such an arrangement of electrodes 26 on the respective substrates of the diffraction devices 20, 20', the electrodes 26 can be bonded at all four edges of the respective substrate.

Figure 13:
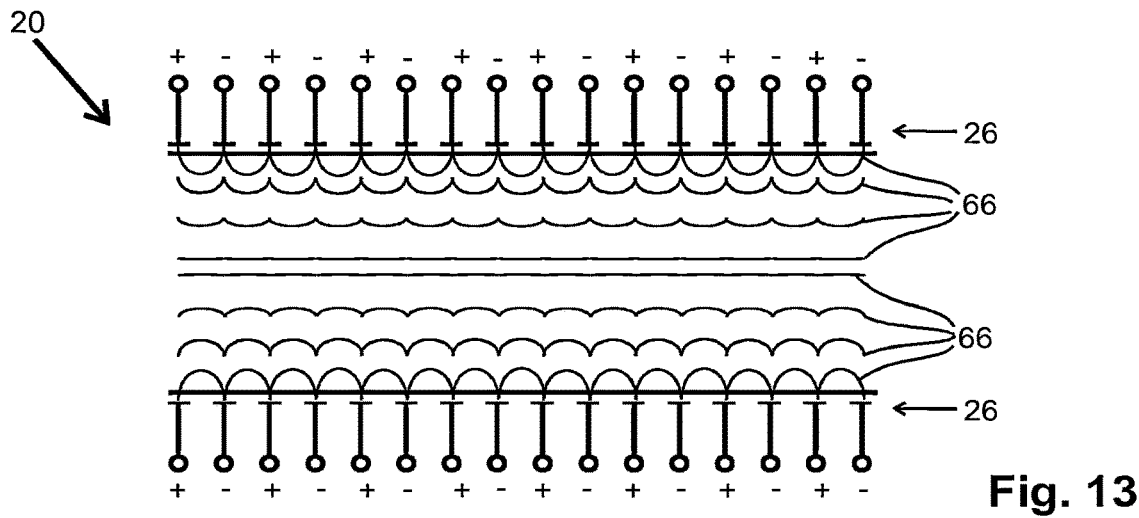
FIGS. 13 to 15 are side views each showing a detail of a diffraction device which is controlled differently or which is in different operating states.
Figure 14:
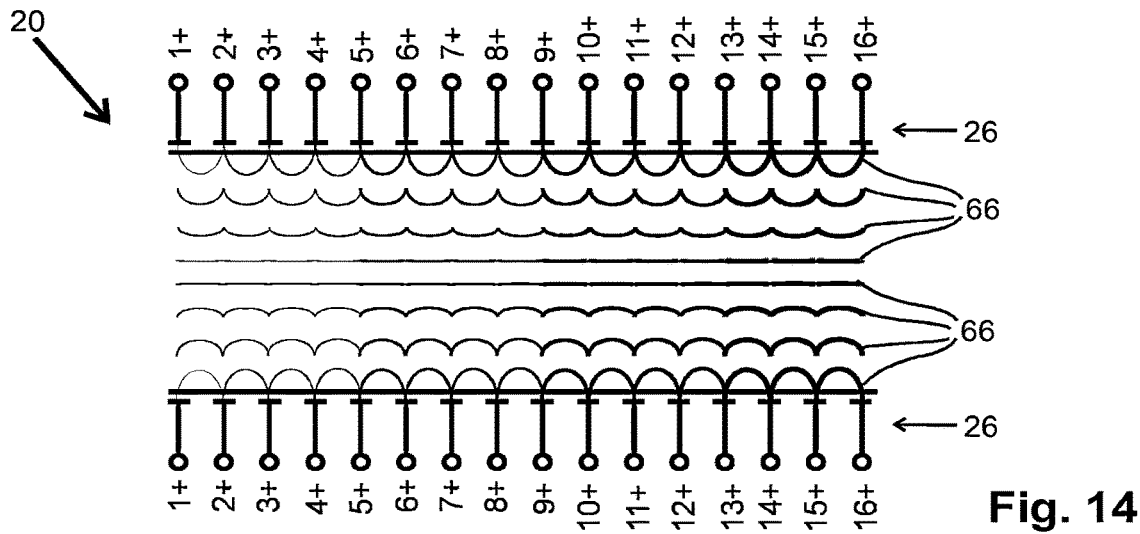
Figure 15:
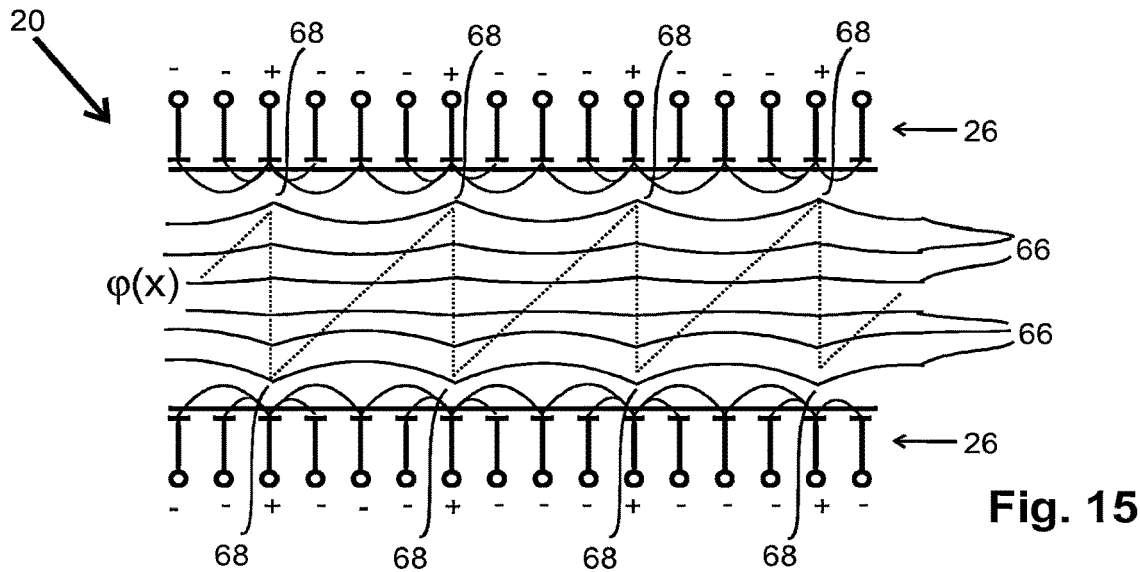

FIGS. 13 to 15 each show a detail of a diffraction device 20. The diffraction device 20 of FIG. 13 is in an inactive state as regards the presentation of image contents, in which the electric field lines 66 run substantially parallel to the surfaces of the substrates in a central region between the two substrates. This is achieved in this embodiment in that neighbouring electrodes of a substrate are supplied with electric voltages with different sign (indicated by '+' and '−') such that the electric field lines 66 run from a positively charged electrode 26 to the two neighbouring negatively charged electrodes 26—and not to the oppositely arranged electrode 26 of the other substrate. The material (not shown) which is arranged between the two substrates can thereby preferably be turned into a defined neutral state very quickly, from which the material is turned back into an active state in which a different diffractive structure is realised.

As an alternative to the connection of electrodes as shown in FIG. 13, a connection of electrodes as shown in FIG. 14 could be provided, according to which the electrodes of the two substrates are supplied with a substantially wedge-shaped voltage gradient. Both the electrodes of the first substrate and the electrodes of the second substrate are here supplied with an electric voltage of identical polarity. This could be realised in that a presettable voltage (indicated by '1+') is supplied to the electrode which is on the far left in the drawing, and that a further, slightly higher, presettable voltage (indicated by '2+', . . . , '16+') is supplied to the respective neighbouring electrode on the right. This will result in an electric field distribution between the two substrates which is strongest on the right-hand side of the diffraction device 20 and which declines in a substantially wedge-shaped manner towards the left. This is indicated by the thickness of the electric field lines 66 in FIG. 14. It must be pointed out that the electric field lines 66 are just indicated schematically in FIGS. 13 to 15. The actual electric field lines may comprise different configurations for the given or other connection types of the electrodes.

FIG. 15 shows another embodiment of a connection of the electrodes 26 of the diffraction device 20 in an inactive state as regards the presentation of image contents. Here, already when adjusting a substantially homogeneous refractive index distribution the electrodes 26 of the diffraction device 20 are operated such to realise an electric field distribution which prepares for the refractive index distribution φ(x) which is to be adjusted next (dotted line). This is achieved in that the electrodes 26 which are situated at positions 68 at which a great refractive index difference or phase shift is to be realised are supplied with a presettable positive voltage such that a desired refractive index distribution is prepared at these positions—already in the inactive state. The other electrodes 26 are supplied with a presettable negative voltage. This makes it possible to adjust a presettable diffractive structure or refractive index distribution for the next active state very quickly, thus allowing a very high refresh rate.

Figure 16:
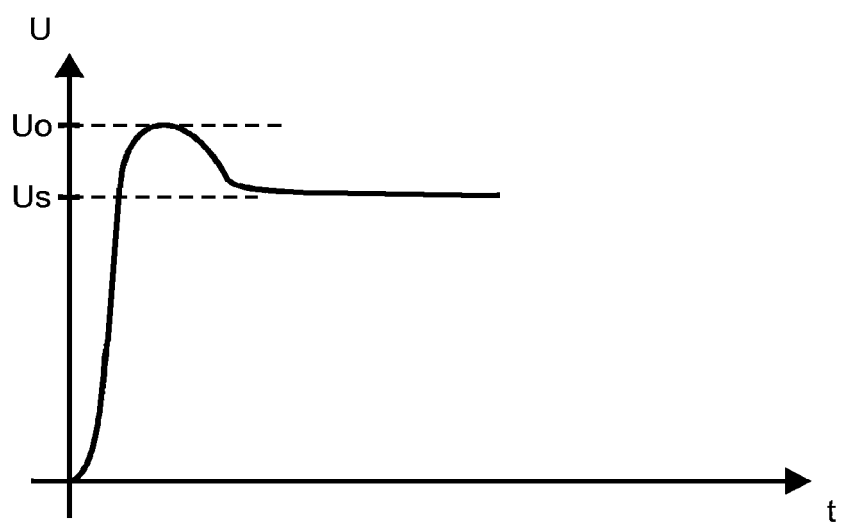
FIG. 16 is a schematic chart that shows a voltage curve over the time that illustrates the voltage profile which can be applied to an electrode of the diffraction device.
Figure 17:
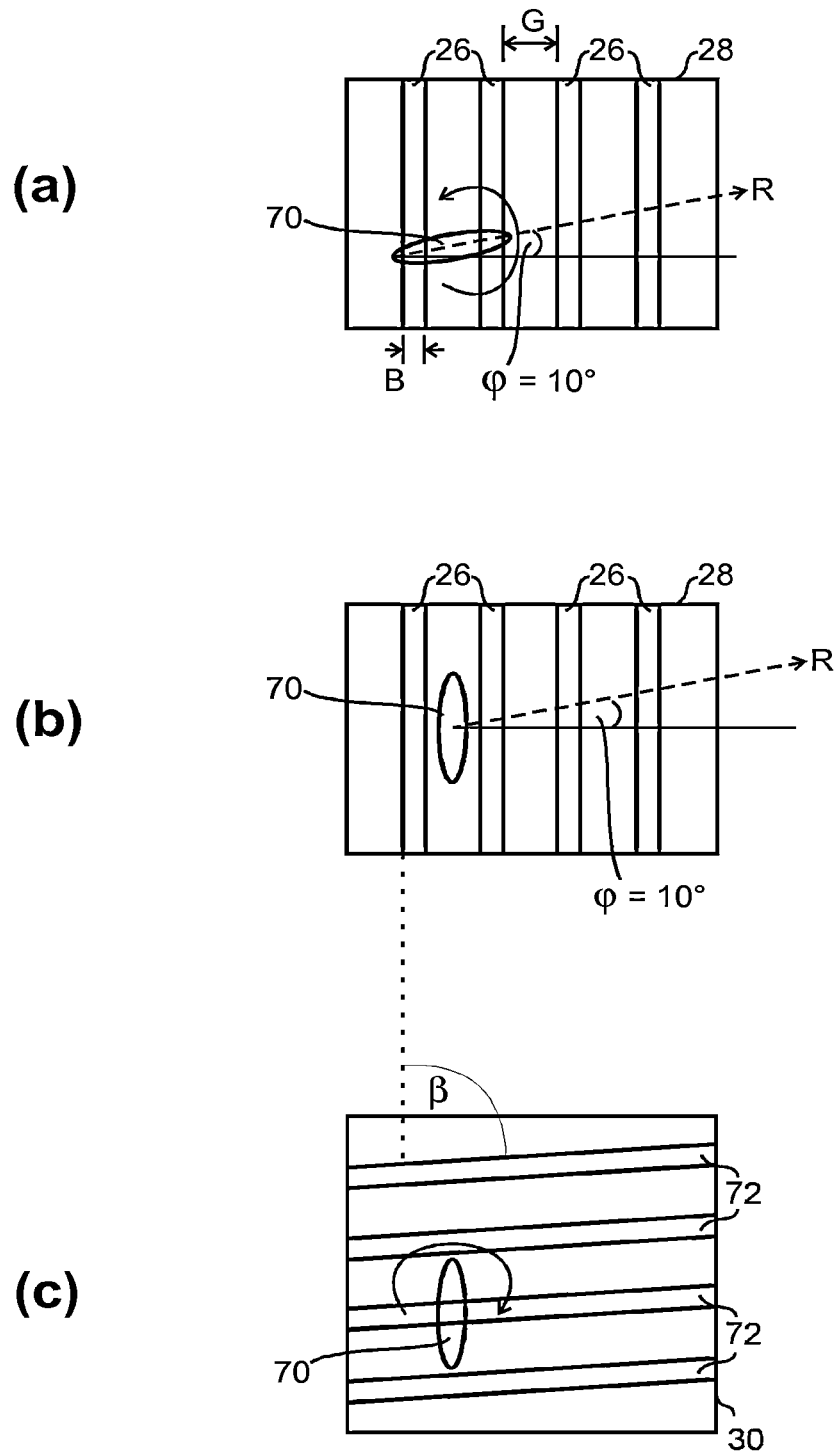
FIGS. 17 and 18 are top views which show the arrangement of electrodes on a substrate.
Figure 18:
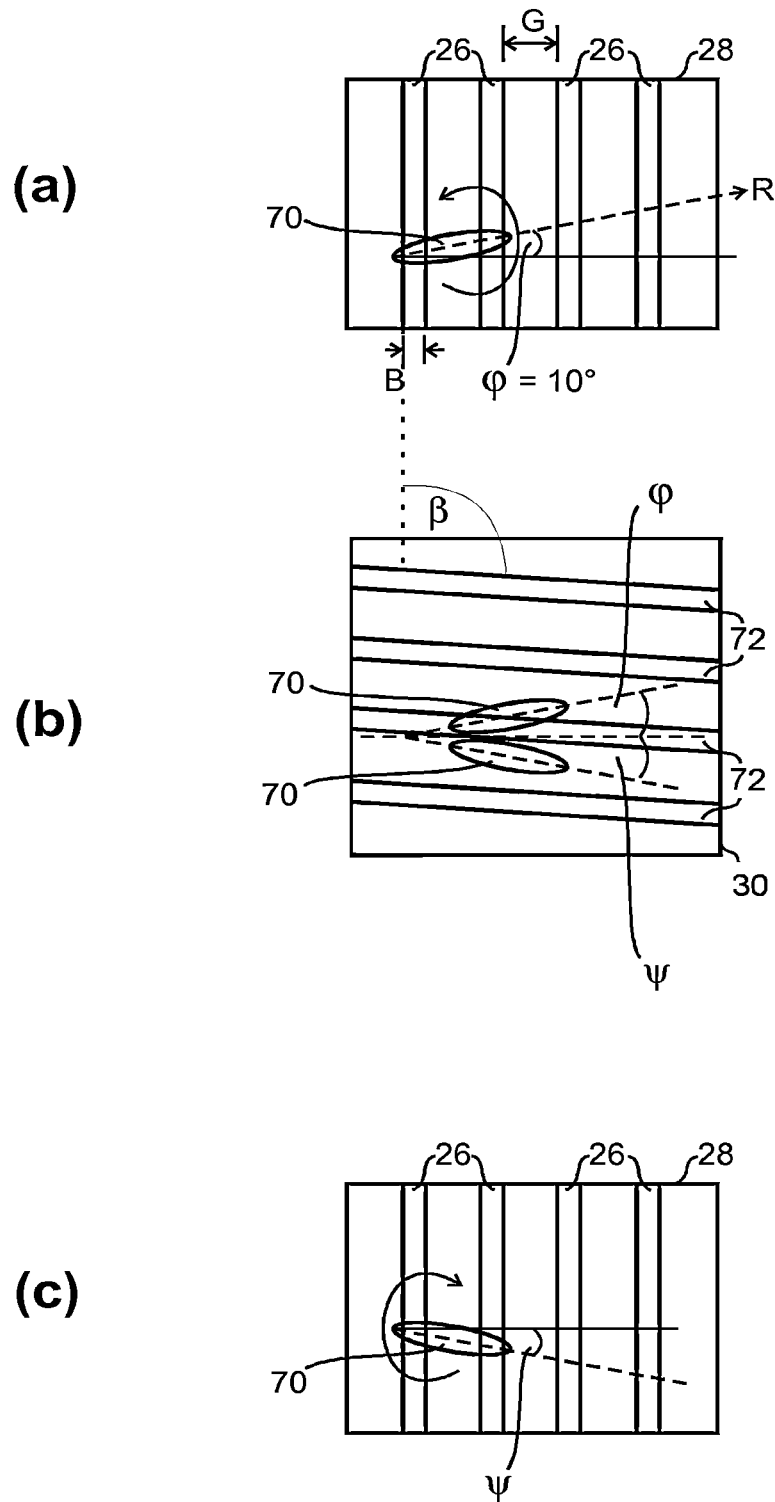
Figure 19:
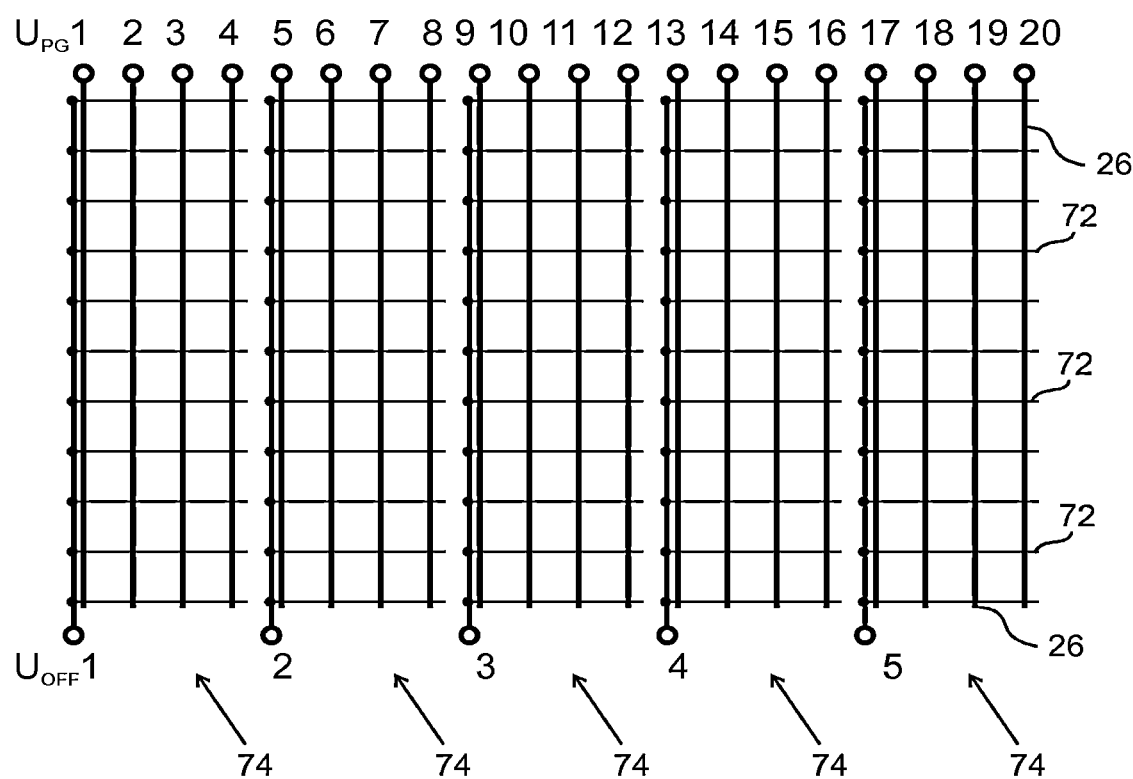
FIG. 19 is a top view which shows a further electrode arrangement.

FIG. 16 shows an embodiment of a voltage curve over the time that illustrates the voltage profile which can be applied to an electrode 26 of the diffraction device 20. According to this curve, at least one electrode 26 of the diffraction device 20 is initially and temporarily supplied with a higher electric voltage UO than would be necessary to adjust the desired refractive index distribution. The electric voltage is then reduced to a value US which is necessary to adjust the desired refractive index distribution. A different diffractive structure can thus preferably be a very quickly.

Figure 20:
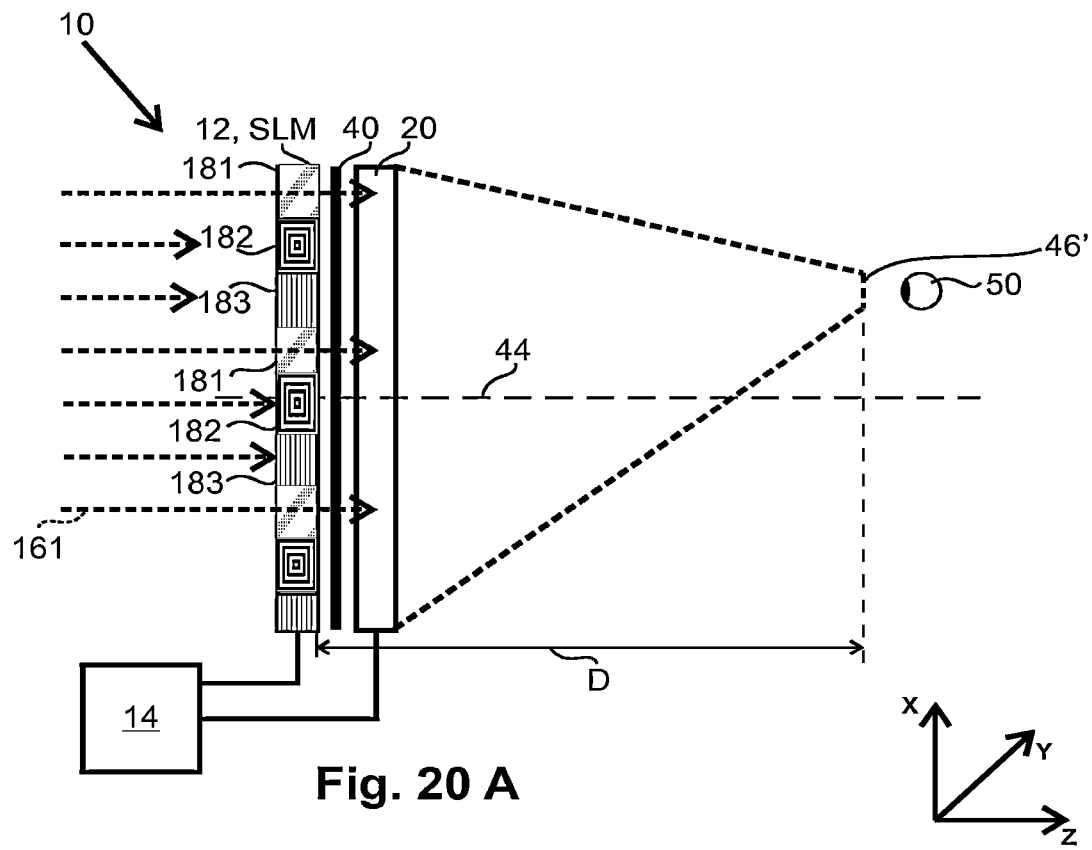
FIGS. 20A, 20B, 21A, 21B, 22 and 23 are top views, each showing a further embodiment of the present invention.
Figure 20:
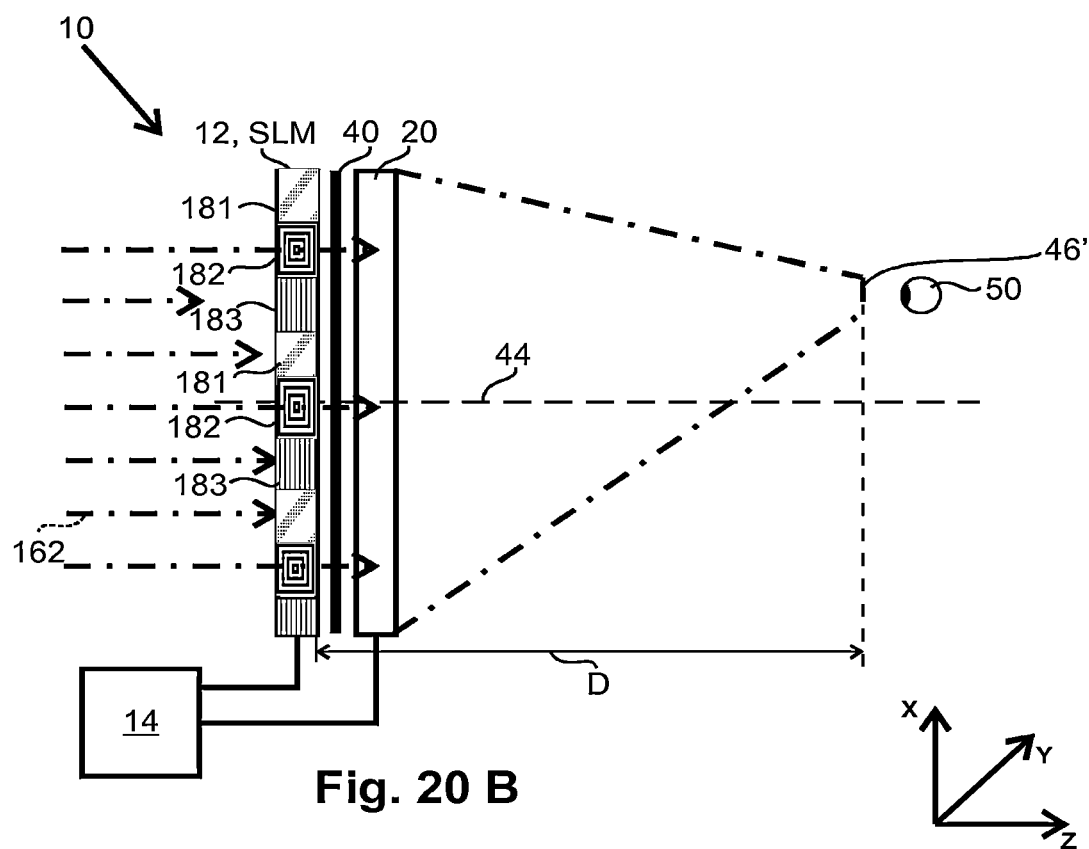

FIG. 20 is a schematic diagram that illustrates a light modulator 12 which comprises pixels 181 with red colour filters, pixels 182 with green colour filters and pixels 183 with blue colour filters (all being magnified in the drawing).

FIG. 20 A shows that the light modulator 12 is illuminated with a light wave field 161 of a red wavelength, such as laser light with a wavelength of 635 nm, at a point of time (or time interval) t1.

The pixels 181 of the light modulator 12 with red colour filter modulate that light with the information which is written to these pixels 181. The pixels 182, 183 with green and blue colour filter block that light due to their colour filters, irrespective of the information which is written to these pixels 182, 183.

The control unit 14 has written to the diffraction device 20 a diffractive structure which diffracts the light of the red wavelength, thus directing it towards an observer 50.

FIG. 20 B shows that the light modulator 12 is illuminated with a different light wave field 162, namely with light of a green wavelength, at a different point of time (or time interval) t2. The pixels 182 of the light modulator 12 with green colour filter modulate that light with the information which is written to these pixels 182. The pixels 181, 183 with the red and blue colour filter, respectively, block that light. The control unit 14 has written to the diffraction device 20 a different diffractive structure which diffracts the light of the green wavelength such to direct it towards the observer 50 too.

At a third point of time (or third time interval) t3 (not shown in FIG. 20), the light modulator 12 is illuminated with a third light wave field of a blue wavelength. The pixels 183 of the light modulator 12 with blue colour filter modulate that light with the information which is written to these pixels 182. The pixels 181, 182 with the red and green colour filter, respectively, block that light. The control unit 14 has written to the diffraction device 20 yet another diffractive structure which diffracts the light of the blue wavelength such to direct it towards the observer 50 again. In other words, FIG. 20 shows an embodiment with a light modulator 12 with colour filters 181, 182, 183 with sequential illumination. In this embodiment, the diffraction device 20, which is arranged downstream of the light modulator 12, seen in the direction of light propagation, is operated such that individual diffractive structures are written to the diffraction device which are adapted to the actual illumination situation, i.e. to the light of the respective wavelength.

Figure 21:
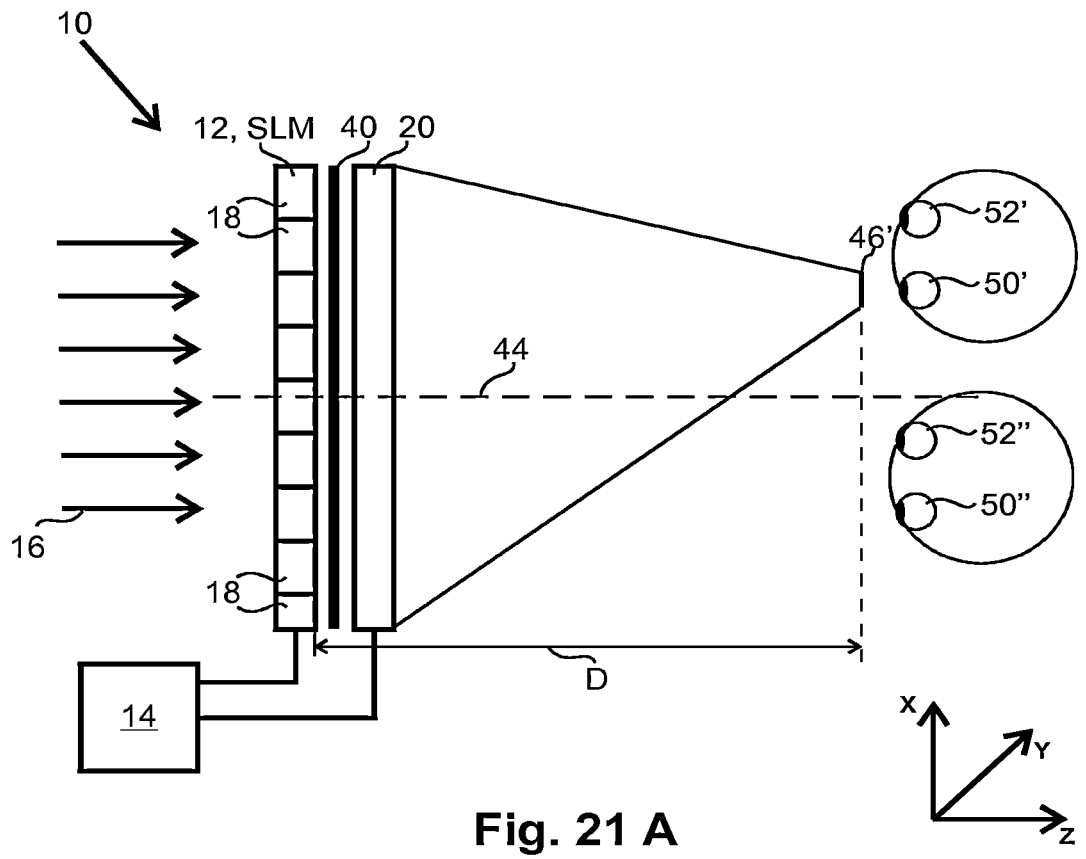
Figure 21:
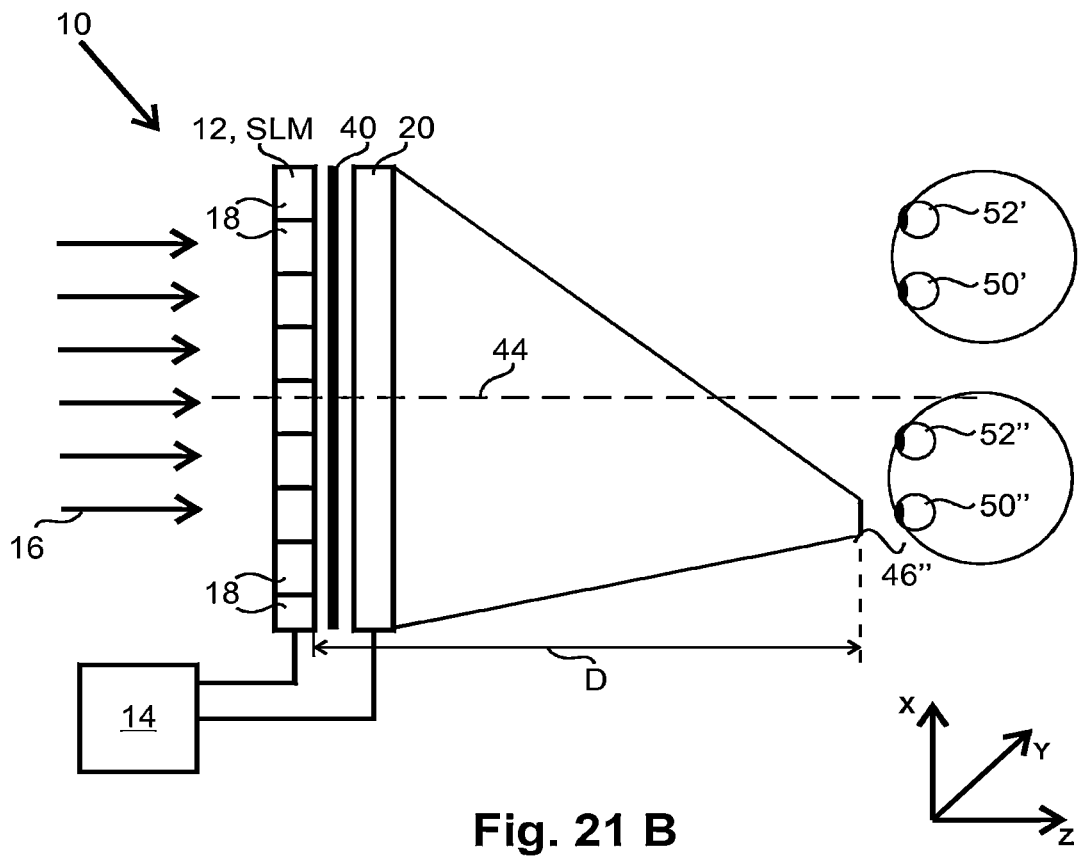

FIG. 21 shows an embodiment where the light modulator 12 is operated by the control unit 14 at a lower refresh rate, while the diffraction device 20 is operated at a higher refresh rate than that of the light modulator 12. The same information which is written to the light modulator 12 is diffracted by the diffraction device 20 and the field lens 40 to the left or right observer eye (e.g. 50', 50") of multiple observers one after another. The control unit 14 has written to the pixels 18 of the light modulator 12 certain information, such as a 3D stereo image or a hologram. Two observers with left observer eyes 50' and 50" and right observer eyes 52' and 52" are situated at different positions in front of the diffraction device 20 and the light modulator 12. The light modulator 12 is illuminated by light wave field 16.

Referring to FIG. 21 A, at a point of time (or time interval) t1 the control unit 14 has written a diffractive structure to the diffraction device 20 which diffracts that light such to direct it at the left observer eye 50' of the first observer.

Referring to FIG. 21 B, at a different point of time (or different time interval) t2, at which the information which is written to the light modulator 12 remains unchanged, the control unit 14 has written a different diffractive structure to the diffraction device 20 which diffracts the light such to direct it at the left observer eye 50" of the second observer.

Analogously, two further different diffractive structures will be written sequentially to the diffraction device 20 during further time intervals t3 and t4 such that light is diffracted and directed at the right observer eyes 52', 52" of the two observers one after another while information for a right observer eye is written to the light modulator 12 (this is not shown in FIG. 21).

The position of the observer eyes 50', 50", 52', 52" relative to the light modulator 12 can be detected for example by a position detection system. The position detection system can be made such that it also delivers information on how many observers are situated in the tracking range of the diffraction device 20. The refresh rate at which information is written to the light modulator 12 does not depend on the number of detected observers in this embodiment. The refresh rate at which the control unit 14 writes a diffractive structure to the diffraction device 20 can be adapted to the number of currently detected observers up to a certain upper limit, where this upper limit depends on the properties of the diffraction device 20 and not on the properties of the light modulator 12.

FIG. 21 shows a system with a single diffraction device 20. This arrangement can be continued analogously to allow a combination of multiple diffraction devices, for example for two crossed diffraction devices (not shown in FIG. 21), of which one diffraction device diffracts light to a horizontal position and the other diffraction device diffracts light to a vertical position of a left observer eye during a time interval t1. However, it is sufficient to use just one diffraction device in a system which comprises for example a vertically diffusing medium and where the observer position must thus only be tracked in the horizontal direction.

FIG. 21 shows an example where the two observers are situated at a substantially identical distance D to the light modulator 12. However, it is also possible for example to vary the focal length of the combination of field lens 40 and diffraction device 20 by writing a diffractive structure which does not only comprise deflecting, but also focussing portions to the diffraction device 20. This way, light can be directed sequentially to observer eyes which are situated at different distances to the light modulator 12 (not shown in FIG. 21).

Figure 22:
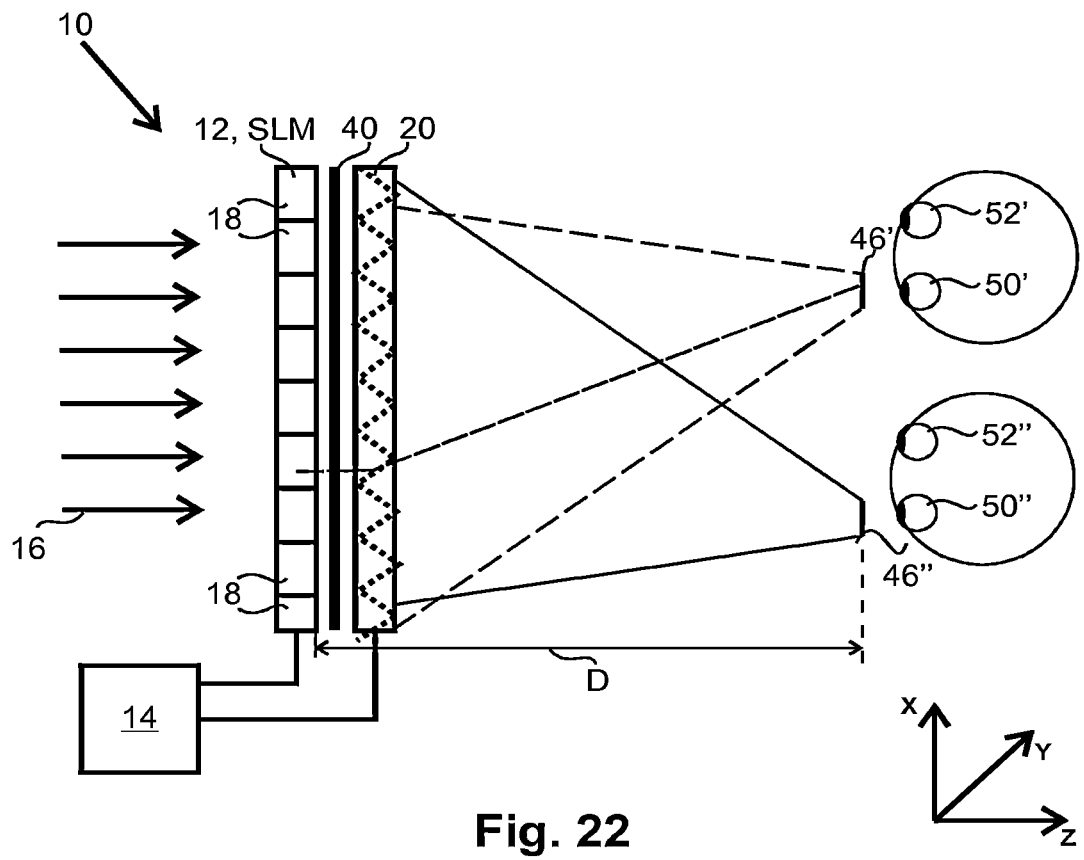

FIG. 22 illustrates a further embodiment with a light modulator 12 and a diffraction device 20 and two observers with left observer eyes 50' and 50". In contrast to the embodiment according to FIG. 21, the information which is written to the light modulator 12 is here diffracted by the diffraction device 20 during a time interval t such that it is substantially simultaneously directed at the left observer eyes 50' and 50" of the two observers. For this, each pixel 18 of the light modulator 12 is assigned to two dedicated spatial regions of the diffraction device 20, which are for example arranged vertically and have half the width of a pixel. A diffractive structure which deflects light towards the observer eye 50' of one observer is written to the one region of the diffraction device 20. A diffractive structure which deflects light towards the observer eye 50" of the other observer is written to the second region of the diffraction device 20. In other words, in this embodiment, information for the left or right observer eye only is written to the light modulator 12 during a time interval, and space division multiplexing is carried out in the diffraction device 20 as regards the direction of deflection towards the left or right observer eyes 50', 50" of the two observers. If multiple observers—namely N observers—have been detected by a position detection system, then N separate spatial regions of the diffraction device 20 can be assigned to each pixel 18 of the light modulator 12 in that case. Each of the N spatial regions of the diffraction device 20 then directs light towards a left or right observer eye of the N observers.

Figure 23:
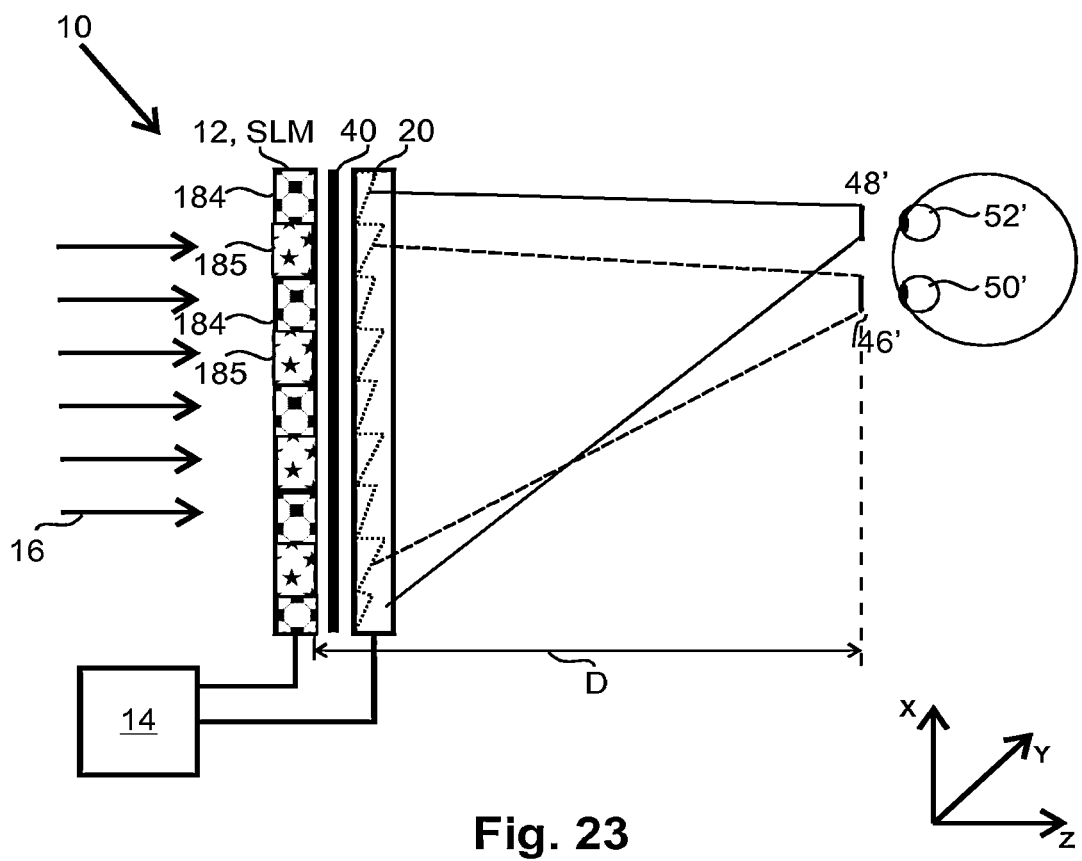

FIG. 23 illustrates a further embodiment with a light modulator 12 and a diffraction device 20 and an observer with a left observer eye 50' and a right observer eye 52'. Certain pixels 184 of the light modulator 12 contain information for the right observer eye 52', and other pixels 185 contain information for the left observer eye 50'. These pixels 184, 185 are assigned to spatial regions of the diffraction device 20 to which different diffractive structures are written which diffract the light such that it is directed at the respective observer eye 50', 52'. In other words, information for both observer eyes is written to the light modulator 12 during one time interval in this embodiment. Both the light modulator 12 and the diffraction device 20 carry out space division multiplexing as regards the direction of deflection towards the left observer eyes 50', 50".

Finally, it must be said that the embodiments described above shall solely be understood to illustrate the claimed teaching, but that the claimed teaching is not limited to these embodiments.

The invention claimed is:

1. A liquid crystal light deflection device comprising:
a first electrode structure comprising a plurality of linear electrodes arranged side by side;
a second electrode structure comprising a common electrode facing the first electrode structure,
a liquid crystal layer disposed between the first electrode structure and the second electrode structure to form a saw-tooth profile due to rotation of orientations of liquid crystal molecules according to an electric field between the first electrode structure and the second electrode structure,
the orientations of the liquid crystal molecules in the liquid crystal layer are turned into a defined neutral state by an electric field formed between adjacent linear electrodes within the first electrode structure, before a different diffractive structure is formed by the saw-tooth profile.

2. The liquid crystal light deflection device according to claim 1, wherein the turning into a defined neutral state is a mode for turning back the liquid crystal molecules to orientations corresponding to a state where no electric fields are formed between the first electrode structure and the second electrode structure.

3. The liquid crystal light deflection device according to claim 2, wherein the electrode structure is provided on a substrate, the orientations corresponding to the state where no electric fields are formed are the orientations of the liquid crystal molecules parallel to the substrate.

4. The liquid crystal light deflection device according to claim 1, wherein the turning into a defined neutral state is performed by applying different voltages to adjacent linear electrodes within the first electrode structure.

5. The liquid crystal light deflection device according to claim 4, wherein the adjacent linear electrodes are supplied with voltages of different sign.

6. The liquid crystal light deflection device according to claim 1, wherein the turning into a defined neutral state is performed by applying an electric field between the first electrode structure and the second electrode structure in order to turn the liquid crystal molecules out of the plane, thereby accelerating a restoration into the defined neutral state.

7. The liquid crystal light deflection device according to claim 1, wherein the liquid crystal molecules are oriented as induced by an interaction of the dielectric anisotropy of a liquid crystal material with an applied electric field.

8. The liquid crystal light deflection device according to claim 1, wherein the liquid crystal molecules have a preferred orientation through an alignment layer.

9. A holographic display device comprising:
a liquid crystal light deflection device comprising:
a first electrode structure comprising a plurality of linear electrodes arranged side by side;
a second electrode structure comprising a common electrode facing the first electrode structure,
a liquid crystal layer disposed between the first electrode structure and the second electrode structure to form a saw-tooth profile due to rotation of orientations of liquid crystal molecules according to an electric field between the first electrode structure and the second electrode structure,
a control circuits configured to control a voltage applied to the first electrode structure and a voltage applied to the second electrode structure,
the orientations of the liquid crystal molecules in the liquid crystal layer are turned into a defined neutral state by an electric field formed between adjacent linear electrodes within the first electrode structure, before a different diffractive structure is formed by the saw-tooth profile.

10. The holographic display device according to claim 9, wherein the turning into a defined neutral state is a mode for turning back the liquid crystal molecules to orientations corresponding to a state where no electric fields are formed between the first electrode structure and the second electrode structure.

11. The holographic display device according to claim 10, wherein the electrode structure is provided on a substrate, the orientations corresponding to the state where no electric fields are formed are the orientations of the liquid crystal molecules parallel to the substrate.

12. The holographic display device according to claim 9, wherein the control circuit controls different voltages applied to adjacent linear electrodes within the first electrode structure to perform the turning into a defined neutral state.

13. The holographic display device according to claim 12, wherein the control circuit controls the adjacent linear electrodes with voltages with different sign.

14. The holographic display device according to claim 9 wherein the liquid crystal molecules are oriented as induced by an interaction of the dielectric anisotropy of a liquid crystal material with an applied electric field.

15. A method of controlling a liquid crystal light deflection device comprising a liquid crystal layer disposed between a first electrode structure and a second electrode structure, the method comprising:

forming a saw-tooth profile based on orientations of liquid crystal molecules in the liquid crystal layer according to an electric field formed between the first electrode structure and the second electrode structure, and turning the orientations of the liquid crystal molecules in the liquid crystal layer into a defined neutral state by forming an electric field between adjacent linear electrodes within the first electrode structure, before a different diffractive structure is formed by the saw-tooth profile.

16. The method of claim 15, wherein the turning into a defined neutral state operation comprises:

applying different voltages to adjacent linear electrodes within the first electrode structure.

17. The method of claim 16, wherein the adjacent linear electrodes are controlled with voltages of different sign.

* * * * *